United States Patent
Burbeck et al.

(10) Patent No.: US 7,143,139 B2
(45) Date of Patent: Nov. 28, 2006

(54) BROADCAST TIERS IN DECENTRALIZED NETWORKS

(75) Inventors: Stephen L. Burbeck, Cary, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 10/108,014

(22) Filed: Mar. 27, 2002

(65) Prior Publication Data

US 2003/0187974 A1 Oct. 2, 2003

(51) Int. Cl.
*G06F 15/16* (2006.01)

(52) U.S. Cl. .............. 709/206; 709/220; 709/221; 709/222; 709/223; 709/224

(58) Field of Classification Search .......... 709/206
See application file for complete search history.

(56) References Cited

U.S. PATENT DOCUMENTS

| | | | |
|---|---|---|---|
| 5,796,952 A | 8/1998 | Davis et al. | |
| 5,862,336 A | 1/1999 | Nakagaki et al. | |
| 5,987,376 A | 11/1999 | Olson et al. | |
| 6,055,568 A | 4/2000 | Adams | |
| 6,069,896 A | 5/2000 | Borgstahl et al. | |
| 6,347,332 B1 | 2/2002 | Malet et al. | |
| 6,366,907 B1 | 4/2002 | Fanning et al. | |
| 6,424,992 B1 * | 7/2002 | Devarakonda et al. | 709/203 |
| 6,446,109 B1 | 9/2002 | Gupta | |
| 6,614,774 B1 | 9/2003 | Wang | |
| 6,665,659 B1 | 12/2003 | Logan | |
| 6,721,747 B1 | 4/2004 | Lipkin | |
| 6,728,232 B1 | 4/2004 | Hasty et al. | |
| 6,732,166 B1 | 5/2004 | Woodruff | |
| 6,735,630 B1 | 5/2004 | Gelvin et al. | |
| 6,742,023 B1 | 5/2004 | Fanning et al. | |
| 6,757,733 B1 | 6/2004 | Gupta | |
| 6,801,929 B1 | 10/2004 | Donoho et al. | |
| 6,826,564 B1 * | 11/2004 | Thompson et al. | 707/4 |
| 6,910,068 B1 | 6/2005 | Zintel et al. | |
| 6,973,053 B1 | 12/2005 | Passman et al. | |
| 2002/0069218 A1 | 6/2002 | Sull et al. | |
| 2002/0133365 A1 | 9/2002 | Grey et al. | |
| 2002/0138471 A1 | 9/2002 | Dutta et al. | |
| 2002/0165815 A1 | 11/2002 | Vincent | |
| 2003/0014759 A1 | 1/2003 | Van Stam | |

(Continued)

OTHER PUBLICATIONS http://www.newarchitectmag.com/archives/2000/12/marmor/"Make the P2P Leap", Web Techniques, Dec. 2000, Michael S. Marmor, pp. 1-13.

(Continued)

*Primary Examiner*—Khanh Dinh
*Assistant Examiner*—Glenford Madamba
(74) *Attorney, Agent, or Firm*—Marcia L. Doubet; Gerald R. Woods

(57) ABSTRACT

Methods, systems, and computer program products are disclosed for classifying nodes into broadcast tiers to reduce traffic in decentralized networks. Persistent identifiers are defined for nodes, allowing nodes to be identified across sessions and invocations, even though they re-enter the network with a different network address. Paths taken by content resources as they traverse the network (e.g. which nodes forwarded the content) are persisted, along with reputation information about nodes (e.g. indicating how successful they are at answering queries from peers). Trust relationships can be derived using the persisted information. Preferred embodiments leverage a web services implementation model.

33 Claims, 18 Drawing Sheets

U.S. PATENT DOCUMENTS

| | | | |
|---|---|---|---|
| 2003/0041141 | A1 | 2/2003 | Abdetaziz et al. |
| 2003/0056093 | A1 | 3/2003 | Huitema et al. |
| 2003/0065653 | A1 | 4/2003 | Overton et al. |
| 2003/0074443 | A1* | 4/2003 | Melaku |
| 2003/0081382 | A1 | 5/2003 | Qui et al. |
| 2003/0088544 | A1 | 5/2003 | Kan et al. |
| 2003/0182421 | A1 | 9/2003 | Faybishenko et al. |
| 2004/0030794 | A1 | 2/2004 | Hugly et al. |
| 2004/0044727 | A1 | 3/2004 | Abdetaziz et al. |
| 2004/0049573 | A1* | 3/2004 | Olmstead |
| 2004/0064512 | A1 | 4/2004 | Arona et al. |
| 2004/0064568 | A1 | 4/2004 | Arona et al. |
| 2005/0052998 | A1 | 3/2005 | Oliver et al. |
| 2005/0086300 | A1* | 4/2005 | Yeager et al. ............... 709/204 |

OTHER PUBLICATIONS http://www.wired.com/news/print/0,1294,39449,00.html "Peer-to-Peer Ready to Groove", Oct. 24, 2000, Michelle Delio, pp. 1-3.

http://www.groove.net/about/press/releases/documentum.html Press Release, "Documentum and Groove Networks Deliver Secure Solution For Cross-Company Content Management", pp. 1-3.

http://www.microsoft.com/presspass/features/2001/mar01/03-19hailstorm.asp "Microsoft Announces "Hailstorm," a New Set of XML Web Services Designed to Give Users Greater Control", pp. 1-3.

http://www.sun.com/smi/Press/sunflash/2001-04/sunflash.20010425.1.html "Sun Unveils Project JXTA, Apr. 25, 2001, Jim Grisanzio pp. 1-2 Internet Visionary Bill Joy Gives Next Generation Network Computing Technology to Open Source Community".

http://www.openp2p.com/pub/a/p2p/2001/04/25/juxtanet.html "The JuxtaNet", Kelly Truelove, Apr. 25, 2001, pp. 1-15.

http://www.openp2p.com/pub/a/p2p/2001/04/25/jxta.html "Inside JXTA", O'Reilly's Emerging Technology Conference May 13-16, 2002 pp. 1-3.

http://www.jxta.org "Project JXTA", "Platform, Shell, myJXTA demo!", Jan. 23, 2002, pp. 1-3.

http://ww.openp2p.com/lpt/a/p2p/2001/05/30/hailstorm.html "Hailstorm: Open Web Services Controlled by Microsoft", Clay Shirky, May 30, 2001, pp. 1-8.

http://www.gnutellanews.com/information/what_is_gnutella.shtml "What is Gnutella?" pp. 1-4.

Schneider, Kortuem, Disseminating Trust Information in Wearable Communities <www.cs.uoregon.edu/research/wearables/papers/schneider-kortuem-huck2k.ps> 2000.

Mazieres, Security and Decentralized Control in the SFS Global File System <ftp.cag.lcs.mit.edu/dm/papers/mazieres:masters.ps.gz>, 1997.

Wylie, Bigrigg, Strunk, Ganger, Survivable Information Storage Systems <www.pdl.cs.cmu.edu/PDL-FTP/Storage/PASIS.pdf>., 2000.

Aberer, K. and Despotovic, Z. Managing trust in a peer-2-peer information system. 2001. ACM Press. Proceedings of the tenth international conference on information and knowledge management. pp.: 310-317.

Chen, R. and Yeager, W. Poblano—A distributed trust model for peer-to-peer networks. 2001. JXTA Security Project White Paper. p. 1-26.

Abdul-Rahman, Alfarez et al., "A Distributed Trust Model", 1997, pp. 1-13, Univery College London, <citeseer.ist.psu.edu/347518.html>.

* cited by examiner

```
    <SOAP-ENV:Header>
305—<p:traversalPathRef xmlns:xlink="www.w3.org/1999/xlink"
    xmlns:p="www.ibm.com/p2p/schema/xlink/linkbase"
    xlink:type="simple" xlink:show="new"
310—xlink:href='http://9.56.34.12/linkbase/lb.xml"
    SOAP-ENV:mustUnderstand="1"/>
    </SOAP-ENV:Header>
```

```
    <SOAP-ENV:Header>
355—<r:reputationRef xmlns:xlink="www.w3.org/1999/xlink"
    xmlns:r="www.ibm.com/p2p/schema/reputations"
    xlink:type="simple" xlink:show="new"
360—xlink:href='http://4.53.12.04/meta-data/reputations/myrep.xml"
    SOAP-ENV:mustUnderstand="1"/>
    </SOAP-ENV:Header>
```

FIG. 4A

```
<?xml version="1.0"?>
<RDF xmlns="www.w3.org/1999/02/22-RDF-syntax-ns#"
xmlns:s="http://description.org/schema/">     410
    <Description about="9.37.43.2-05/04/01-12:02:05:37-Netzero.net">
        <s:QuerySet stature="0.34" totalQueries="2145"
ID="uuid:933335D49-3......">
            <s:Query>purchase order \d{3}-\d{4}-\d{3}</s:Query>
            <s:Query>partner profile list</s:Query>
            <s:Query>\s*-NDA.tiff</s:Query>
        </s:QuerySet>
    </Description>
</RDF>
```

405 — `<s:QuerySet ...>`
415 — `ID="uuid:..."`
420 — `<s:Query>purchase order...`
425 — `<s:Query>partner profile list...`
430 — `<s:Query>\s*-NDA.tiff...`

```
<?xml version="1.0"?>
<RDF xmlns="www.w3.org/1999/02/22-RDF-syntax-ns#"
xmlns:s="http://description.org/schema/">
    <Description about="9.37.32.2-05/04/01-12:02:05:37-Netzero.net">
        <s:QuerySet>
            <s:Query stature=".12" totalQueries="1234">purchase order
\d{3}-\d{4}-\d{3}</s:Query>
            <s:Query stature=".89" totalQueries="89">partner profile list</s:Query>
            <s:Query stature=".50" totalQueries="2">\s*-NDA.tiff</s:Query>
        </s:QuerySet>
    </Description>
</RDF>
```

FIG. 5

```
<?xml version="1.0"?>
<rdf:RDF
    xmlns:rdf="http://www.w3.org/1999/02/22-rdf-syntax-ns#"
    xmlns:s="http://description.org/shcema/">
505 — <rdf:Description
510 — about="purchase_order 123-4567-890.xml">
515 — <s:Creator date="02/03/01" time="01:02:03:04">Ajamu Wesley</s:Creator>
520 — <s:synoposis>Purchase order for AMEX: customer # 123-4567-890</s:synopsis>
    </rdf:Description>
</rdf:RDF>
```

```
<xml version="1.0">                                                                              605
<ResourceSet xmlns:xlink="http://www.w3.org/1999/xlink"
 xmlns="www.ibm.com/p2p/schema/xlink/linkbase" xlink:type="extended"
 xlink:title="resource
 definition">
                            615
   <node local="true" xlink:type="locator" xlink:show="undefined"
    xlink:href="http://9.56.34.12/soap/rpcrouter"
    xlink:role="9.37.43.2-05/04/01-12:02:05:37-NetZero.net"/>

<node local="false" xlink:type="locator" xlink:show="undefined"
    xlink:href="http://12.12.03.21/soap/rpcrouter"
    xlink:role="12.37.43.5-03/02/01-03:45:23:02-Mindspring.com"/>

<node local="false" xlink:type="locator" xlink:show="undefined"
    xlink:href="http://12.12.03.24/soap/rpcrouter"
    xlink:role="12.37.43.5-03/03/01-08:35:13:04-Mindspring.com"/>

<content local="true" xlink:type="locator" xlink:show="new"
    xlink:href="file://usr/awesley/etc/downloads/purchase_order 123-4567-890.xml"
    xlink:role="purchase_order 123-4567-890.xml"/>
   ......

</ResourceSet>
```

<?xml version "1.0"?>
<traversalPath xmlns:xlink="http://www.w3.org/1999/xlink"
705  xmlns="www.ibm.com/p2p/schema/xlink/linkbase"
     xlink:type="extended" xlink:title="resource definition">
                                    715
710  <arc xlink:type="arc"
720  xlink:from="12.37.43.5-03/03/01-08:35:13:04-Mindspring.com"
725  xlink:to="12.37.43.5-03/02/01-03:45:23:02-Mindspring.com"
     xlink:show="undefined" xlink:actuate="onRequest"
     resource="purchase_order 123-4567-890.xml"/>

730  <arc xlink:type="arc"
735  xlink:from="12.37.43.5-03/02/01-03:45:23:02-Mindspring.com"
740  xlink:to="9.37.43.2-05/04/01-12:02:05:37-NetZero.net"
745  xlink:show="undefined" xlink:actuate="onRequest"
     resource="purchase_order 123-4567-890.xml"/>

750  </traversalPath>
```

FIG. 9

```
<?xml version="1.0"?>
<SOAP-ENV:Envelope xmlns:SOAP-ENV="http://schemas.xmlsoap.org/soap/envelope"
SOAP-ENV:encodingStyle="http://schemas.xmlsoap.org/soap/encoding">
  <SOAP-ENV:Body>
905——<p:notification xmlns:p="http://www.ibm.com/p2p/schema/notification" type="alive"  910
915——    wsil="http://4.53.12.04/wsil_repos/file_sharing.wsil"
920——    callback="http://4.53.12.04/soap/rpcrouter">
925——  <p:linkBaseID>9.37.43.2-05/04/01-12:02:05:37-NetZero.net</p:linkBaseID>
930——  <p:reputationRef xmlns:xlink="http://www.w3.org/1999/xlink" xlink:type="simple"
         xlink:show="new"
935——    xlink:href="http://4.53.12.04/meta-data/reputations/myrep.xml"/>
  </p:notification>
  </SOAP-ENV:Body>
</SOAP-ENV:Envelope>
```

```
<?xml version="1.0"?>
<SOAP-ENV:Envelope xmlns:SOAP-ENV="http://schemas.xmlsoap.org/soap/envelope"
SOAP-ENV:encodingStyle="http://schemas.xmlsoap.org/soap/encoding">
  <SOAP-ENV:Body>
1005—<p:spy xmlns:p="http://www.ibm.com/p2p/schemas/xlink/linkbase
1010—uuid="urn:spy.[LBuuid].0001"/>
  </SOAP-ENV:Body>
</SOAP-ENV:Envelope>
```

```
<?xml version="1.0"?>
<SOAP-ENV:Envelope xmlns:SOAP-ENV="http://schemas.xmlsoap.org/soap/envelope"
SOAP-ENV:encodingStyle="http://schemas.xmlsopa.org/soap/encoding">
  <SOAP-ENV:Body>
    <q:query xmlns:q="http://www.ibm.com/p2p/schema/query">
1205 ———— purchase order 123-456-890
1210 ———— </q:query>
  </SOAP-ENV:Body>
</SOAP-ENV:Envelope>
```

```
1300
<?xml version="1.0"?>
<SOAP-ENV:Envelope xmlns:SOAP-ENV="http://schemas.xmlsoap.org/soap/envelope"
SOAP-ENV:encodingStyle="http://schemas.xmlsoap.org/soap/encoding">
  <SOAP-ENV:Header xml:base="http:4.34.54.12/meta-data/content/"/>
1305——<q:content-meta-data xmlns:p="http://www.ibm.com/p2p/schema/query"
      xmlns:xlink="http://www.w3.org/1999/xlink" xlink:type="simple" xlink:show="embed"
      xlink:href=purchase_order 123-4567-890.rdf#xpointer(child::queryResponse
1310——[position()=1])/>                                      ——1315
  </SOAP-ENV:Header>
  <SOAP-ENV:Body>
1320——<q:queryResponse contentID="purchaseOrder 123-4567-890.xml">
      <rdf:RDF xmlns:rdf="http://www.w3.org/1999/02/22-rdf-syntax-ns#"
1330         xmlns:s="http://description.org/schema/"/>
1335——  <rdf:Description about="purchaseOrder 123-4567-890.xml">
1340——    <s:Creator date="02/03/01" time="01:02:03:04">Ajamu Wesley</s:Creator>
1325——    <s:synopsis>Purchase Order for AMEX: customer #123-4567-890</s:synopsis>
        </rdf:Description>
      </rdf:RDF>
    </q:queryResponse>
  </SOAP-ENV:Body>
</SOAP-ENV:Envelope>
```

POST soap/rpcrouter
Host: www.acme.com
Content-Type: text/xml; charset="utf-8"
Content-Length: nnnn
SOAPAction: "Some-URI"

<SOAP-ENV:Envelope
 xmlns:SOAP-ENV="http://schemas.xmlsoap.org/soap/envelope/"
 SOAP-ENV:encodingStyle="http://schemas.xmlsoap.org/soap/encoding/">
  <SOAP-ENV:Body>
1405——<m:getContent ID="purchaseOrder 123-4567-890"——1410
         xmlns:m="http://www.ibm.com/p2p/schema/getContent/">
  </SOAP-ENV:Body>
</SOAP-ENV:Envelope>
```

```
HTTP/1.1 200 OK
MIME-Version: 1.0
Content-Type: Multipart/Related; boundary=MIME_boundary; type=text/xml;
start="<http://www.acme.com/purchaseOrderResponse.xml>"
Content-Description: This is the optional message description.

--MIME_boundary
Content-Type: text/xml; charset=UTF-8
Content-Transfer-Encoding: 8bit
Content-ID: <http://www.acme.com/purchaseOrderResponse.xml>
Content-Location: http://www.acme.com/purchaseOrderResponse.xml <?xml version='1.0' ?>
<SOAP-ENV:Envelope xmlns:SOAP-ENV="http://schemas.xmlsoap.org/soap/envelope/">
```
1505 —
```
    <SOAP-ENV:header>
        <p:traversalPathRef xmlns:p="http://www.ibm.com/p2p/schema/xlink/linkbase" ... />
        ...
    </SOAP-ENV>
```
1510 —
```
    <SOAP-ENV:header>
        <r:reputationRef xmlns:r="http://www.ibm.com/p2p/schema/reputations" ... />
        ...
    </SOAP-ENV>
    <SOAP-ENV:Body>
        <m:getContentResponse xmlns:m="http://www.ibm.com/p2p/schema/getContent">
            <ContentRef>
                http://www.acme.com/contentRepository/purchaseOrder 123-4567-890.xml
            </ContentRef>
        </m:getContentResponse>
        ...
    </SOAP-ENV:Body>
</SOAP-ENV:Envelope>

--MIME_boundary

Content-Type: text/xml
Content-Transfer-Encoding: UTF-8
Content-ID: <
http://www.acme.com/contentRepository/purchaseOrder 123-4567-890.xml>
Content-Location:
http://www.acme.com/contentRepository/purchaseOrder 123-4567-890
```
1520 —
```
[purchase order content]
--MIME_boundary--
```

```
<peek xlink:type="simple"
    xlink:href =
        "http://www.ibm-managedservices.com/p2p/management/servlet/rpcrouter"
    SOAP-ENV:mustunderstand="1"/>
```

*1710* — xlink:href line

```
<access command=write
    xlink:type="simple" xlink:href =
        "http://www.ibm-managedservices.com/p2p/management/servlet/rpcrouter"
    SOAP-ENV:mustUnderstand="1"
    reputationRef="http://4.53.12.04/meta-data/reputations/myrep.xml"/>
</assert>
```

```
<access command=read
    xlink:type="simple" xlink:href =
        "http://www.ibm-managedservices.com/p2p/management/servlet/rpcrouter"
    SOAP-ENV:mustUnderstand="1"
    linkBaseURI="http://9.56.34.12/linkbase/lb.xml#
        xpointer(ResourceSet/content[2])"/>
```

*1770* / *1780*

BROADCAST TIERS IN DECENTRALIZED NETWORKS

RELATED INVENTIONS

The present invention is related to the following commonly-assigned inventions, all of which were filed concurrently herewith and which are hereby incorporated herein by reference: U.S. Pat. (Ser. No. 10/109,373), titled "Interminable Peer Relationships in Transient Communities"; U.S. Pat. (Ser. No. 10/107,696), titled "Content Tracking in Transient Communities"; U.S. Pat. (Ser. No. 10/107,842), titled "Providing Management Functions in Decentralized Networks"; U.S. Pat. (Ser. No. 10/108,088), titled "Persisting Node Reputations in Transient Communities"; and U.S. Pat. (Ser. No. 10/107,960), titled "Managing Storage Resources in Decentralized Networks".

BACKGROUND OF THE INVENTION

1. Field of the Invention

The present invention relates to computer networks, and deals more particularly with methods, systems, and computer program products for classifying nodes into broadcast tiers to reduce traffic in decentralized networks.

2. Description of the Related Art

In peer-to-peer, or "P2P", networks, each communicating node has a networking program which allows it to initiate communications with another node having that program. The nodes are considered "peers" because the network is decentralized, with each node having the same capabilities (for purposes of the P2P exchange). The promise of P2P networks is a more efficient network where resources such as central processing unit ("CPU") cycles, memory, and storage go unwasted. These networks are ad hoc, in that nodes may join and leave the networks at will. Thus, P2P networks may be characterized as "transient" networks.

Prior art P2P network programs provide facilities for dynamic query and discovery of peers. However, the existing techniques suffer from several drawbacks. Lack of persistent network addresses is one such drawback. Due to the dynamic addressing schemes with which network addresses are assigned to nodes, each time a particular node enters a P2P network, it will typically have a different Internet Protocol ("IP") address. Users with a dial-up account have different IP addresses for each log-in. Users of some "always-connected" networks such as certain digital subscriber line, or "DSL", accounts may also have a different IP address for different log-ins.) This lack of persistent network addressing makes it difficult for nodes to "remember" where a particular service or content resource is available. Instead, when a node needs content or some type of service, it must typically issue a new discovery request and then determine how to choose from among a potentially large number of responses. This communication results in very bursty traffic.

Another drawback of existing P2P networks is that they have no trust model: because nodes have no persistent network addresses, there are no existing means of persistently tracking which nodes are considered trustworthy and which are not. Thus, when a node (or the user at that node) chooses a peer node from which to obtain a service or content, there is no "track record" or history available for use in determining how to select from among the set of nodes which answered the dynamic query. This absence of a trust model also means that existing P2P networks do not provide support for secure transactions among members of transient communities. (The JXTA project from Sun Microsystems, Inc. is a P2P architecture which provides the notion of a "peer group" or "shared spaced", where nodes within the peer group may publish services. Among these services are a set of core services including membership, access, and resolver services. The defined approach applies the client/server models of authentication, authorization, and naming to peer groups. That is, the notion of centralization is maintained, but only at the peer group level. These peer groups are not properly characterized as being a transient community. Likewise, the Groove® & product from Groove Networks, Inc. provides a set of "shared services" within a peer community, where this set includes security, member, and access control services. The security mechanisms are public key infrastructure ("PKI") for authentication, and key exchange with shared secret keys for confidentiality. The requirement thus implied for digital signatures, digital certifications, and a shared security service negates the notion of a transient community.)

One popular P2P network is known as "GnutellaNet". GnutellaNet uses a protocol that allows users to exchange files directly between the storage resources of their computers, without first going to a "download" web site. "Napster" is another well known P2P network implementation, in which users connect to a centralized web site to identify MP3 music files which they can then download from one another's computers. Whereas Napster is adapted specifically for MP3 files, GnutellaNet allows downloading any type of file content. A number of other P2P network implementations exist.

P2P networks have the potential to be more efficient than client/server networks. This increased efficiency potential arises from the fact that P2P networks have no centralized server. In the client/server model, the bulk of processing capability resides on a centralized server, and thus the processing load tends to be concentrated at this server. In P2P networks, there is the potential for distributing tasks across all the nodes in the network, resulting in more efficient use of network resources. The dynamic nature of P2P systems, and their potential for efficient load distribution, has been promoted as making them the next evolution in information technology ("IT") architecture. However, because of limitations such as those described above, existing P2P networks have been relegated to the consumer and "for-free" markets, and are not well suited for conducting high volume business (such as eBusiness or Business-to-Business transactions). (And as stated above, existing P2P implementations are not well suited for secure transactions within transient communities, which are typically critical for eBusiness.)

Furthermore, conventional P2P systems are unmanaged and homogenous, making it impractical to implement P2P within a large-scale, robust IT architecture where many different types of devices must be capable of interoperating in a manageable way.

What is needed are techniques for capitalizing on the advantages and potential of P2P networks, while avoiding the drawbacks and limitations of existing approaches.

SUMMARY OF THE INVENTION

An object of the present invention is to provide techniques for capitalizing on the advantages and potential of P2P networks, while avoiding the drawbacks and limitations of existing approaches.

Another object of the present invention is to provide techniques for improving P2P networks.

Yet another object of the present invention is to provide techniques for reducing traffic in decentralized networks by classifying nodes into broadcast tiers, and using these tiers when broadcasting messages.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving peer-to-peer computing networks. In one aspect of preferred embodiments, the improvements comprise classifying nodes into broadcast tiers to reduce traffic in networks having transient network communities where a collection of the nodes making up the network may change over time. Preferably, this technique comprises: selecting, by a first node in the network, one or more other nodes perceived to be best suited for responding to a request from the first node, as compared to nodes not selected; sending the request from the first node to each of the selected nodes; and sending the request from the first node to one or more of the nodes not selected only if a satisfactory response is not received from any of the selected nodes within a configurable time interval.

In another alternative, this technique comprises: selecting, by a first node in the network, one or more other nodes perceived to be best suited for responding to a request from the first node, as compared to nodes not selected; sending the request from the first node to each of the selected nodes; and if none of the selected nodes provides a satisfactory response, repeating the selecting and sending such that the nodes perceived to be next-best suited, among the nodes not yet selected, have an opportunity to respond to the request. A configurable time interval is preferably used to limit how long the first node waits for the responses from the selected nodes before concluding that no satisfactory response was received.

The selection of nodes preferably uses the first node's knowledge of prior behavior of the other nodes, this knowledge persisting even though the other nodes may leave the network and re-enter the network with a different network address. The prior behavior for a particular node may indicate indicates how well suited the particular node is for responding to this request (or requests in general), or how efficient the particular node is at responding to this request (or requests in general).

The present invention will now be described with reference to the following drawings, in which like reference numbers denote the same element throughout.

BRIEF DESCRIPTION OF THE DRAWINGS

FIG. 3A provides a sample Simple Object Access Protocol ("SOAP") header to illustrate how preferred embodiments identify the traversal path of a particular content resource, and FIG. 3B provides a sample SOAP header to illustrate how preferred embodiments identify the reputation of a particular node;

FIGS. 4A and 4B provide sample Extensible Markup Language ("XML") documents to illustrate how preferred and alternative embodiments specify a node's reputation as node metadata;

FIG. 5 provides a sample XML document to illustrate how preferred embodiments describe a content resource using content meta-data;

FIG. 6 provides a sample XML document to illustrate how preferred embodiments specify a resource set, which is created according to preferred embodiments to record mappings between persistent node identifiers and current network endpoints as well as mappings between persistent content identifiers and current storage locations for that content;

FIG. 7 provides a sample XML document to illustrate how preferred embodiments specify a content traversal path definition, identifying the path taken by a particular content resource since it entered the P2P network;

FIG. 9 provides a sample XML document that illustrates how preferred embodiments communicate reputation information in an "alive" notification message issued during the bootstrap flow of FIG. 8;

FIG. 10 provides a sample XML document illustrating a "spy" message that may be used by preferred embodiments to propagate "alive" messages within a P2P network;

FIG. 12 provides a sample SOAP envelope to illustrate how preferred embodiments broadcast a query during the requester flow of FIG. 11, and FIG. 13 provides a sample SOAP envelope showing how a node may respond to that query;

FIG. 14 provides a sample HyperText Transfer Protocol ("HTTP") request message embodying a SOAP envelope to illustrate how preferred embodiments request delivery of content/services from a selected node during the requester flow of FIG. 11, and FIG. 15 provides a sample HTTP response message showing how the requested content, or a result of the requested service, may be delivered to the requester;

FIGS. 17A–17C illustrate sample headers that may be used with an optional system management capability disclosed herein.

DESCRIPTION OF PREFERRED EMBODIMENTS

Figure 1:
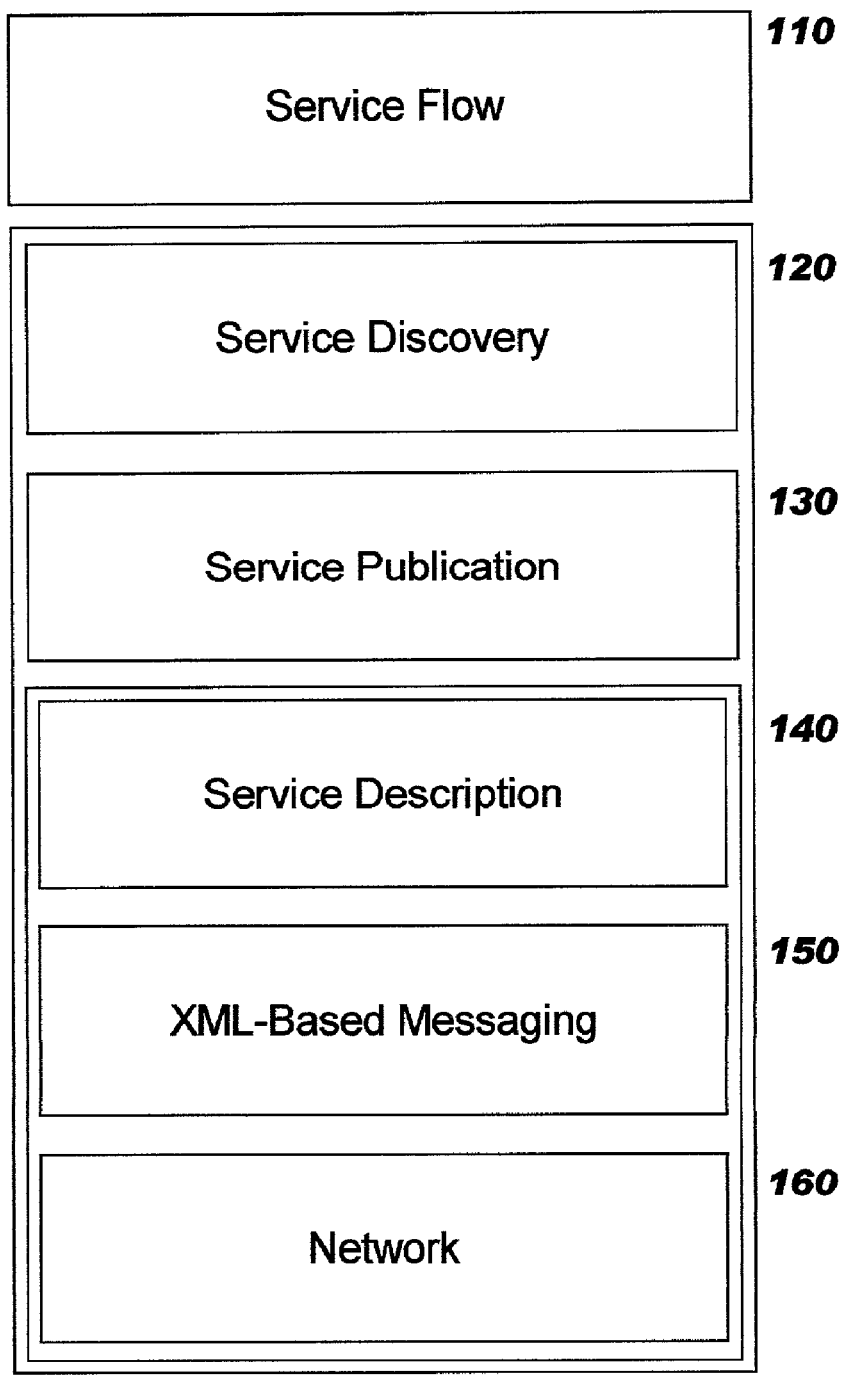
FIG. 1 illustrates a prior art web services stack which may be leveraged by an implementation of the present invention.

The present invention defines techniques for improving P2P network operations. A persistent identifier is assigned to each network participant, i.e. node, such that the node can be identified after it leaves and re-enters the network. The path taken by content traversing the network is tracked and persisted as well. Persisting content paths and contextual nodal information, as disclosed herein, enables maintaining peer relationships across invocations. The disclosed techniques thereby address shortcomings of the prior art, allowing relationships among peer devices to persist beyond a single session even though the community in which the participants communicate is, by definition, a transient community.

The disclosed techniques support the inherent dynamic network addressing characteristics of P2P networks, while providing support for heterogenous network nodes. The persisted information may be leveraged to support business enterprise operations including network management, transactions, and the application of security policies.

Furthermore, the disclosed techniques facilitate providing self-healing networks. A self-healing network is one in which the network applies task management/monitoring at run-time, independent of human interaction or management by a separate computing system. The techniques disclosed herein enable nodes to cultivate relationships with their peers and persist this information, such that malicious or poorly performing nodes can be identified as such (and then can be prevented from adversely affecting the network, once detected), relative to performance and functional integrity. (See http://www.research.ibm.com/autonomic/, which discusses the concept of self-healing networks in general, using the term "autonomic computing". The techniques described therein do not teach self-healing in transient network communities without a centralized authority.)

The techniques disclosed herein also facilitate improved efficiency in P2P network operations. Rather than requiring queries to be broadcast to an entire subnet, as in a prior art P2P network, the present invention discloses a tiered broadcast technique which capitalizes on the persisted knowledge of the nodes in the network to reduce the amount of network traffic generated.

Various peer nodes will coexist within a typical P2P network. The peer network itself may represent a set of vertical peers which interact with one another in a consumer/supplier relationship (for example, carrying out a sequence of related business activities which comprise a service that may be defined as a directed graph between sub-services). Or, the network may represent a set of horizontal peers providing a common function. The techniques of the present invention may be used to augment the P2P architecture for providing automation and management capabilities to such nodes.

As an example, a group of peer nodes might provide storage resources within a Storage Area Network, or "SAN". A Storage Service Provider ("SSP") maintains SANs on a subscription or pay-per-use basis for its customers, and typically has service level agreements ("SLAs") in place which specify the SSP's service commitments to those customers. Customer billing may be adversely affected if the SLA commitments are not met. In a P2P network, nodes which need storage can issue a dynamic network query to find other nodes providing this capability. This type of dynamic query and discovery of peers is available in prior art P2P networks. However, as stated earlier, existing P2P networks have no trust model, and no ways of knowing how to select a "good" storage-providing node. Using the techniques of the present invention, an SSP can manage autonomous storage partitions as P2P storage utilities having reputations which are determined in real time, reflecting how well storage requests are currently being handled. Using this dynamically computed information, storage devices which are best able to respond to storage requests can be determined, facilitating dynamic allocation of storage to requesters. Furthermore, specific storage resources which can answer particular content requests can be more easily identified using techniques of the present invention. Responsiveness and performance commitments within an SLA can therefore be more consistently realized. (How well a storage node handles storage requests may comprise the success rate of responding to requests, how efficient the node is at responding to requests, the available storage capacity of the node, what content is available from that node, etc.)

By persisting content paths and contextual nodal information, as will be described in more detail below, peer nodes are able to maintain their relationships with one another, and their knowledge of one another, across sessions—even though one or more of the nodes may leave and subsequently re-enter the P2P network (where those re-entering nodes typically have changing network addresses). Furthermore, according to the techniques disclosed herein, as contextual information about a specific node is obtained, the node develops what is referred to herein as a "reputation". This reputation can then be used as the basis for a trust model. Reputations are described in more detail below. (See the discussion of FIGS. 4A and 4B for a description of the information which is preferably persisted for a node's reputation.)

Preferred embodiments of the present invention are deployed using a web services model and a web services approach to P2P networking, as will be described with reference to FIG. 1, although the disclosed techniques may be adapted for use in other environments as well. The advantageous techniques of the present invention are discussed herein primarily as applied to file sharing (i.e. identifying which content is available from which nodes; remembering the path taken by particular content as it traverses the network; requesting content from a peer, and receiving that content; etc.). However, this is for purposes of illustration and not of limitation. In addition to simple file sharing interactions, the disclosed techniques may be used with more complex interactions. For example, as is known in the art, the web services model facilitates carrying out complex interactions. In general, a "web service" is an interface that describes a collection of network-accessible operations. Web services fulfill a specific task or a set of tasks, and may work with one or more other web services in an interoperable manner to carry out their part of a complex workflow or a business transaction which is defined as a web service. As an example, completing a complex purchase order transaction may require automated interaction between an order placement service (i.e. order placement software) at the ordering business and an order fulfillment service at one or more of its business partners. When this process is described as a web service, a node using techniques of the present invention may locate the peer nodes capable of carrying out this service, and select a particular node (e.g. based on the node's reputation). Upon request, the located peer node performs the service (which typically comprises a number of sub-services) and then returns a result of that service to the requesting node.

Web services technology is a mechanism which is known in the art for distributed application integration in client/server networks such as the World Wide Web, and enables distributed network access to software for program-to-program operation in these networks. Web services leverage a number of open web-based standards, such as HTTP, SOAP and/or XML Protocol, Web Services Description Language ("WSDL"), and Universal Description, Discovery, and Integration ("UDDI"). HTTP is commonly used to exchange messages over TCP/IP ("Transmission Control Protocol/Internet Protocol") networks such as the Internet. SOAP is an XML-based protocol used to invoke methods in a distributed environment. XML Protocol is an evolving specification of the World Wide Web Consortium ("W3C") for an application-layer transfer protocol designed to enable application-to-application messaging. XML Protocol may converge with SOAP. WSDL is an XML format for describing distributed network services. UDDI is an XML-based registry technique with which businesses may list their services and with which service requesters may find businesses providing particular services.

Distributed application integration in client/server networks is achieved by issuing UDDI requests to locate distributed services through a UDDI registry, and dynamically binding the requester to a located service using service information which is conveyed in a platform-neutral WSDL format using SOAP/XML Protocol and HTTP messages. (References herein to SOAP should be construed as referring equivalently to semantically similar aspects of XML Protocol.) Using these components, web services provide requesters with transparent access to program components which may reside in one or more remote locations, even though those components might run on different operating systems and be written in different programming languages than those of the requester. (For more information on SOAP, refer to http://www.w3.org/TR/2000/NOTE-SOAP-20000508, titled "Simple Object Access Protocol (SOAP) 1.1, W3C Note 8 May 2000". See http://www.w3.org/2000/xp for more information on XML Protocol. More information on WSDL may be found at http://www.w3.org/TR/2001/NOTE-wsdl-20010315, titled "Web Services Description Language (WSDL) 1.1, W3C Note 15 Mar. 2001". For more information on UDDI, refer to http://www.uddi.org/specification.html". HTTP is described in Request For Comments ("RFC") 2616 from the Internet Engineering Task Force, titled "Hypertext Transfer Protocol—HTTP/1.1" (June 1999).)

Referring now to FIG. 1, preferred embodiments of the techniques disclosed herein leverage the IBM web services interoperability stack 100 to provide underlying support for communications among nodes within the P2P network. This is by way of illustration, however, and not of limitation: other support mechanisms may be leveraged without deviating from the inventive concepts disclosed herein. Components of web services interoperability stack 100 will now be described.

Preferably, a directed graph is used to model the operations involved in executing a web service comprised of multiple sub-services, using prior art techniques. See, for example, commonly-assigned U.S. Ser. No. 09/956,276, filed Sep. 19, 2001), entitled "Dynamic, Real-Time Integration of Software Resources through Services of a Content Framework". In the techniques disclosed therein, nodes of the graph represent the operations carried out when performing the service (where these operations may also be referred to as sub-services), and the graph edges which link the graph nodes represent potential transitions from one service operation to another. These graph edges, or "service links", can be qualified with one or more transition conditions, and also with data mapping information if applicable. The conditions specify under what conditions the next linked service should be invoked. Often, these conditions will be determined using the results of a previous service invocation. Data mapping refers to the ability to link operations of the directed graph and transfer data from one operation to another. For example, the data mapping information may indicate that the output parameters of one sub-service are mapped to the input parameters of another sub-service.

The Web Services Flow Language ("WSFL") is preferably used for supporting these directed graphs. This is indicated in FIG. 1 by service flow support 110. The manner in which the directed graphs are processed by a WSFL engine to carry out a complex web service is not pertinent to an understanding of the present invention, and will not be described in detail herein. A detailed discussion of WSFL may be found in the WSFL specification, which is entitled "Web Services Flow Language (WSFL 1.0)", Prof. Dr. F. Leymann (May 2001). This document may be obtained from IBM and is also available on the Internet at http://www-4.ibm.com/software/solutions/webservices/pdf/WSFL.pdf.

Automated discovery 120 and publication 130 of web services (e.g. web services available from various ones of the nodes in the P2P network) are preferably provided using UDDI messages to access a UDDI registry. A WSDL layer 140 supports service description documents. SOAP may be used to provide XML-based messaging 150. Protocols such as HTTP, File Transfer Protocol ("FTP"), e-mail, message queuing ("MQ"), and so forth may be used for network support 160. At run-time, services are found within a registry using the UDDI service discovery process, and bound to using information from their WSDL definitions. The WSFL run-time then uses these definitions to aggregate the services.

According to preferred embodiments of the present invention, file sharing operations are facilitated using information retrieved from a UDDI registry, and more complex web services may also be supported in this same manner. (Refer to the discussion of FIG. 2, below, for more information on use of the registry.)

The present invention discloses techniques whereby nodes in a P2P network can be modeled as classes, rather than as strictly peers. For example, the present invention describes "system" nodes. As used herein, the term "system node" refers to nodes within the P2P network which provide functions of the type that would be managed by a system administrator in conventional client/server networks. These functions comprise network operations such as network management, load balancing, monitoring, security, and so forth. A P2P network having nodes that implement the present invention may span local area networks and enterprises, and is bound only by extent of the world wide web. (See, for example, the discussion of the "spy" message, which enables a node to learn about nodes which may be located on different subnets. In prior art P2P networks, on the other hand, broadcast traffic is typically limited to nodes within the subnet due to the configuration of filters which monitor IP addresses.) Thus, various classes of nodes may join the network, and new types of nodes may join the network; using the techniques disclosed herein, this occurs in a non-disruptive fashion.

This concept of classes of nodes, and system nodes in particular, is an optional aspect of the present invention, and may be used to create a hybrid form of P2P networks where some nodes may direct other nodes or influence information stored by those nodes. The special functions available to system nodes will be discussed in more detail herein.

According to preferred embodiments, nodes implementing the present invention use a web service model which runs within the context of an Apache eXtensible Interaction System ("AXIS") engine with handlers that leverage the AXIS chaining framework. (Refer to http://xml.apache.org/axis/index.html for more information on Apache AXIS, which is an implementation of the SOAP protocol by the Apache Software Foundation.)

"AXIS" is a run-time environment for SOAP services, wherein web services run using a container model. A servlet called a "router" receives an inbound SOAP request message, determines which code is required to carry out that request, deserializes objects required for that code, and invokes the code. When the invoked code completes execution, the router serializes the result into an outbound SOAP response message.

The term "AXIS chaining" refers to configurable "chains", or sequences, of message handlers that dictate the order of execution for inbound and outbound messages. A "handler" is executable code that implements a particular function, and can be linked with the function of other handlers (through the chaining mechanism). The handlers perform pre- or post-processing of SOAP requests. A deployment descriptor is used to specify how a particular service is to be deployed, including how to serialize/deserialize the objects used by that service and what AXIS handler chain to use. For example, SOAP message exchanges may use encrypted data. Upon receiving a message containing encrypted data, a decryption handler would decrypt the data (as a pre-processing step) and pass it to the appropriate message-processing code. When a result is returned, an encryption handler encrypts the result (as a post-processing step) prior to transmitting the result in another SOAP message.

An AXIS engine supports three types of handler chains. One is a transport chain, specifying the message transport mechanism (such as HTTP). Another is a service-specific chain. For a particular service "XYZ", for example, the service-specific chain prescribes what handlers to invoke when a message is received for service XYZ or generated by service XYZ. The third handler chain is a global chain, specifying handlers that are to be invoked for all messages.

Figure 2:
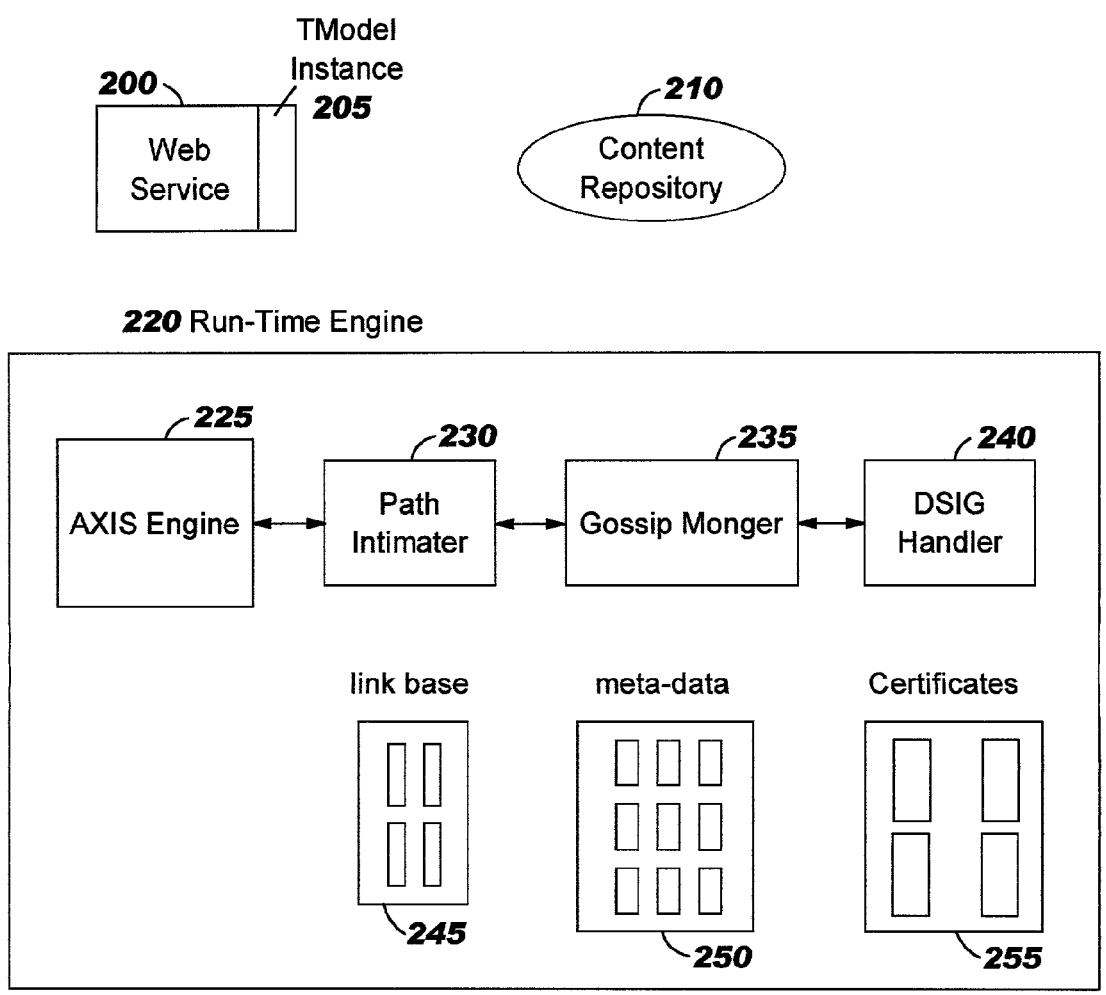
FIG. 2 provides a diagram illustrating components of the present invention, including an abstracted view of their placement and interconnection within a networking environment.

FIG. 2 depicts components used in preferred embodiments of the present invention, showing abstractly how those components are located and interconnected within a networking environment. These components will now be described.

In preferred embodiments, a run-time engine 220 embodying the present invention comprises an AXIS execution engine 225; three AXIS handlers 230, 235, 240 in a global handler chain; a linkbase repository 245; a meta-data repository 250; and a digital certificate repository 255. This run-time engine 220 is preferably embodied within a web service, illustrated by web service 200. A web service may optionally choose to implement a tModel instance 205. As is known in the art, a tModel indicates the behaviors or specifications which are implemented by a web service. tModels are stored in a UDDI registry to facilitate scanning the registry for implementations of a particular service. tModels may be used within the context of preferred embodiments of the present invention to specify the types of queries a web service supports. One or more content repositories, exemplified by content repository 210, store a node's local content and/or references to remotely-located content which may be accessed by the node represented by run-time engine 220.

Three AXIS handlers are used in preferred embodiments, as will be described in more detail, and are referred to herein as a "Path Intimater" 230, a "Gossip Monger" 235, and a digital signature ("DSIG") handler 240. These handlers will now be described.

As stated earlier, the present invention defines techniques for persisting contextual node information and the paths traversed by content which is shared among nodes of the P2P network. The Path Intimater 230 manages the persisted content paths, which are defined herein as using a directed graph model. In these directed graphs, the graph nodes correspond to peer nodes through which the content has traveled, and the graph arcs represent the content passing between the peer nodes which are connected by each arc. (These directed graphs are not to be confused with the directed graphs discussed earlier, which are used to define complex web service interactions and which are supported using WSFL.)

According to preferred embodiments, the XML Linking ("XLink") language is used as the means of representing the directed graphs which define persisted content paths. The XLinking language is defined in "XML Linking Language (XLink) Version 1.0, W3C Recommendation 27 Jun. 2001", which may be found on the Internet at location http://www.w3.org/TR/xlink/. As is known in the art, XLink syntax may be used to define simple, markup-style links (comprising outbound links which point to remotely-located resources and inbound links which identify resources linked to the local node), or more complex "extended" links. (It is not known in the art, however, to use XLink links as disclosed herein.) Extended links are used to represent graphs of nodes and the arcs between them. One type of extended link is a "third party" link. Third party XLinks associate remote resources, meaning that the link specification is stored separately from the content it links together. FIG. 7, described below, illustrates how preferred embodiments of the present invention may leverage XLinks for persisting content traversal path definitions (or more generally, message traversal path definitions).

Note that while preferred embodiments are described herein as using the persisted path definitions to remember paths taken by content resources, this is by way of illustration and not of limitation. Path definitions may also be persisted for other information, such as the results of executing a service. Thus, the term "content" as used herein may be interpreted as representing any type of information transmitted between nodes, and in particular, "content" is used as a shorthand for referring to already-generated content or content that may be generated by requesting a node to execute a service. Furthermore, the persisted paths may be interpreted as representing the path of a message, without regard to the type of information carried by that message.

When a collection of third party XLinks is stored together in an XML document, the collection is referred to as a "linkbase" or a "linkbase document". Thus, a linkbase as the term is used herein refers to a collection of traversal path definitions expressed as third party XLinks. Linkbase identifiers are defined using a format disclosed herein to uniquely identify nodes in the P2P network. (Refer to the discussion of FIG. 4A, below, for more information about linkbase identifiers.)

Thus, the Path Intimater 230 manages persisted message paths as linkbases. These linkbases contain linksets, where a linkset defines the path traversed by a particular content resource. These linkbases are discussed in more detail herein.

The Path Intimater 230 is responsible for appending a SOAP header of the form shown in FIG. 3A to outbound SOAP messages to convey content traversal information. This header 300 contains a <traversalPathRef> tag 305 (which, in the example of FIG. 3A, is prepended with a name space identifier of "p" for "path"), and this <traversalPathRef> tag provides a reference 310 to a linkset which stores the traversal path of the specified content within the peer network. In the example of FIG. 3A, the value of the "href" attribute 310 indicates that the traversal path information is stored in a linkbase document accessible using the Uniform Resource Locator ("URL") "http://9.56.34.12/linkbase/lb.xml".

The Path Intimater 230 of the receiver is responsible for updating the receiver's linkbase accordingly upon receipt of an incoming SOAP header with a <traversalPathRef> element. This processing comprises adding the linkbase identifier of the receiving node in an arc at the end of the traversal path identified by reference 310. (Thus, if the receiving node subsequently forwards the content associated with the traversal path, then the revised traversal path identified in the SOAP header described with reference to FIG. 3A will properly identify the forwarding node.) Refer to FIG. 7, below, for more information about how traversal paths identify paths between nodes.

The Gossip Monger 235 manages reputations as meta-data pertaining to nodes. In addition, the Gossip Monger will process content meta-data and evaluate that content meta-data when revising node reputations. Preferred embodiments of the present invention leverage the Resource Description Framework ("RDF") notation to specify the meta-data for describing both content and nodes. (RDF is a notation designed for specifying web-based meta-data. Refer to "Resource Description Framework, (RDF) Model and Syntax Specification, W3C Recommendation 22 Feb. 1999", provided on the Internet by the W3C at http://www.w3.org/TR/REC-rdf-syntax/, for more information on RDF.) Because P2P networks are highly distributed, and IP addresses of nodes can change over time, as has been described, the Gossip Monger disclosed herein provides an evolutionary trust model where trust evolves over time. Initially, a node trusts itself, and over time the node gathers meta-data about content it receives through interactions with its peers and the path taken by that content. This gathered meta-data may be considered as providing a type of history or audit trail. The more content is received from a particular peer with positive results, the stronger the trust relationship with that peer will become. Optionally, a node may also derive trust from relationship information it obtains from its peers, where this relationship information describes interactions the peers have had with other peer nodes (which the node itself may not have interacted with).

Referring now to FIGS. 4A and 4B, preferred and alternative techniques for specifying reputation data are illustrated. In preferred embodiments, a node's reputation comprises an indication of the services provided by the node and/or content which is available from the node, and the quality of service provided by that node. A node's reputation is preferably embodied as meta-data in messages sent from the node (and stored by receivers). In preferred embodiments, the quality of service is specified as a numeric value (referred to as the "stature" value) which represents how successful this specific node is at answering queries it receives from other nodes in the network. The quality of service component of a node's reputation may, in some cases, indicate a malicious node (for example, a node which has exhibited a tendency to be a source of rogue agents or resources). The ability to associate a reputation with a dynamically addressed node facilitates trust in the decentralized P2P world, and once the reputation information is available, a trust model employing security policies may be applied to P2P interactions. A major inhibitor to eBusiness in P2P networks is thereby removed. (Note that while preferred embodiments are described herein with reference to reputations that are learned dynamically, it may be desirable in a particular implementation to initialize or pre-configure the reputation of one or more nodes, for example to allow a systems administrator to facilitate systems administration, and such an implementation is considered to be within the scope of the present invention. This approach may be used to give selected nodes a relatively high stature, effectively designating those nodes as system nodes.)

According to preferred embodiments, transient nodes in a P2P network are identified using a linkbase identifier ("ID"), or "LBuuid", where this LBuuid has the form:

[IP_Address-Date-Time-Domain]

and is modeled on the concepts of Universal Unique Identifiers, or "UUIDs". UUIDs are known in the art as a technique for uniquely identifying an object or entity on the public Internet. (However, the LBuuid format is not known. Prior art UUIDs typically comprise a reference to the IP address of the host that generated the UUID, a timestamp, and a randomly-generated component to ensure uniqueness.)

As an example of the LBuuids disclosed herein, the node represented by the sample reputation in document 400 of FIG. 4A has the LBuuid 9.37.43.2-05/04/01-12:02:05:37-Netzero.net which is shown as the value of the "about" attribute 410 of <Description> tag 405. In this example, the IP address component is "9.37.43.2", the date component is "05/04/01", the time component is "12:02:05:37", and the domain component is "Netzero.net". As defined herein, this information indicates that the node's original IP address upon its first entry into the P2P network was "9.37.43.2", and that this initial entry into the network occurred on date "05/04/01" at time "12:02:05:37" in the network domain "Netzero.net". This LBuuid will be used for identifying this particular node henceforth, as disclosed herein, enabling the node's reputation to be persisted and also allowing references to this node in content path traversal definitions to be resolved.

Note that, at a given point in time, the current IP address of the node represented by the LBuuid in FIG. 4A is not guaranteed to be that indicated in the LBuuid, and is more than likely some other value obtained from a dynamic address assignment mechanism upon a subsequent entry into the P2P network. The LBuuid persistently representing a node is associated with the node's current IP address through a mapping stored in a resource set. (Resource sets are described below, with reference to FIG. 6.)

The <Description> tag 405 brackets the reputation information for this node. In the example, a child tag named <QuerySet> 415 is specified, and has a "stature" attribute. In preferred embodiments, the stature attribute has a numeric value that indicates how successful (or unsuccessful) this node is at performing queries. The stature attribute value is preferably specified as a non-integer value ranging between −1 and +1, where a negative stature value indicates a malicious node. Preferably, a corresponding "totalQueries" attribute is also specified, and its value is an integer indicating the total number of queries processed by the node. Thus in the example of FIG. 4A, a node has received 2,145 queries and has successfully performed 34 percent of those queries. (An optional "ID" attribute is shown in the example, which uses the conventional UUID format to provide a value which may be used to uniquely identify this query set 415.)

In an alternative embodiment, stature (i.e. success rate) information may be associated with individual queries, rather than with an entire query set. This alternative is illustrated in FIG. 4B, where the "stature" and "totalQueries" attributes have been specified on the <Query> tags rather than on the <QuerySet> tag. As will be obvious, other representations for the stature information may be used without deviating from the concepts of the present invention. For example, a single attribute might be used, having a value of the form "34 percent of 2145" or "34, 2145". As another alternative, rather than using a stature value ranging between −1 and +1, separate attributes might be used to indicate unsuccessful (or malicious) results and successful results; or, counters might be used rather than percentages.

Returning to the discussion of FIG. 4A, in the syntax used for preferred embodiments, <QuerySet> tag 415 has one or more <Query> child elements, where this collection of <Query> elements enumerates the set of queries (preferably expressed as regular expressions) which may be satisfied by this node. In this example, the node can satisfy three different queries 420, 425, 430.

The regular expression syntax of the first <Query> tag 420 indicates that the node can process queries of the form "purchase_order 999-9999-999" that is, the text string "purchase_order " followed by 3 numeric values, a hyphen, 4 numeric values, another hyphen, and 3 numeric values. (In the example used herein, these numeric fields are intended to specify a customer number.)

The second <Query> tag 425 in the example query set indicates that the node can process queries expressed as the text string "partner profile list". The third <Query> tag 430 represents queries which are text strings ending in "-NDA.t-iff".

Optionally, different or additional information may be used to determine a node's reputation, and thus the information represented by FIGS. 4A and 4B is for purposes of illustration and not of limitation. For example, it may be useful to track a node's efficiency, and reputation data may be used for this purpose. If efficiency is measured as response time for handling queries, for example, then a response time attribute might be added to the node's reputation (either as a query-specific value using the approach of FIG. 4B, or more generally using the approach of FIG. 4A). As stated earlier, a node's reputation is processed by a Gossip Monger handler. Thus, the reputation handling described herein may be extended by a handler as needed to support additional or different types of reputation data.

Tracking a node's efficiency facilitates making a more advised selection among content/service providers than is available in prior art P2P networks. When used in the SSP environment discussed earlier, an SSP using this node efficiency information can make run-time decisions about how to select a storage resource and provision storage resources, thus improving service to customers of the SSP and increasing the likelihood of meeting commitments in SLAs.

A reputation provides hints to remote nodes about the capabilities of a node, and as described herein, provides that information in terms of the node's ability to respond to queries. When used for the purpose of file sharing, issuing a query to a node represents asking the node "Do you have a file of this description?". A responding node supplies its reputation to inform the requester that it can answer that query (i.e. it can provide the requested file), and also to indicate how successful it has been in the past at serving files (using the approach in FIG. 4A) or at serving this particular file (using the approach in FIG. 4B).

Referring now to FIG. 5, an example showing the preferred technique for specifying content meta-data (that is, information about particular content) is illustrated. Using meta-data information of this form, a node can programmatically determine what content queries it can respond to. In preferred embodiments, RDF is used for specifying content meta-data in a similar manner to how RDF was used for reputation meta-data (see FIGS. 4A and 4B). As shown in the example in FIG. 5, the "about" attribute 510 of <Description> tag 505 specifies the identifier of the content described by document 500. The value of an "about" attribute is, according to preferred embodiments, an identifier that specifies a file name or other storage location where the content for responding to a particular query is stored. Thus, in the example, this content is stored at location "purchase_order 123-4567-890.xml". This identifier serves as a persistent content key which can be used to associate content meta-data with the actual content.

The <Description> tag 505 in the example syntax has child tags <Creator> 515 and <synopsis> 520. A <Creator> tag preferably has a date attribute and a time attribute, the values of which specify the date and time of creation of the described content. (Alternatively, the date and time might be combined into a single "Date_Time" attribute.) The value of the <Creator> tag 515 identifies the person (in this example) who created the content. Alternatively, a process identifier might be used as the value of the <Creator> tag, such as the LBuuid of the P2P node from which the content originated. The <synopsis> tag 520 preferably has a free text value, and may be used to provide a human-readable description of the corresponding content. Thus, in the example, <synopsis> 520 indicates that the content stored at "purchase_order 123-4567-890.xml" is a purchase order for AMEX customer #123-4567-890.

The information in the <Description> element, or selected portions thereof, may be presented to a human user, for example to assist that person in selecting a content/service provider from among multiple candidates. In a more automated environment, information from the <Description> element may be analyzed by a programmatic selection process. As will be obvious the content meta-data shown in the example is merely illustrative of the type of information that may be stored, and the form in which that information may be expressed.

The Gossip Monger is responsible for appending a SOAP header of the form shown in FIG. 3B to outbound SOAP messages to inform a receiving node of reputation information. This appended reputation header 350 contains a <reputationRef> tag 355 that provides a reference (using "href" attribute 360) to a reputation repository where the transmitting node's reputation information is stored. (This stored reputation information pertains to the transmitting node itself, and preferably also contains reputation information about peer nodes of which the transmitting node is aware.)

The Gossip Monger 235 of the receiver identifies reputation meta-data as a header field within an inbound SOAP message, and processes the reputation meta-data as further described herein.

The Digital Signature handler 240 digitally signs message entities so as to ensure message integrity and sender authentication. This handler preferably follows the SOAP Digital Signature specification from the W3C, and leverages a PKI to manage certificates and apply/verify signatures. SOAP digital signatures and PKI techniques are known in the art, and will not be described in detail herein.

Given the appropriate AXIS handlers or Gossip Monger privileges, a system node may actually read/write to remote peer linkbases and meta-data repositories directly, for example to forcefully add themselves to a peer group, to insert content traversal path definitions, or to manage a peer's reputation (e.g. to modify node X's stored reputation information such that it now identifies a member Z of node X's peer group as being malicious). Preferably, this type of system management capability is implemented using a new AXIS handler, where the system management function may be considered as a Super Gossip Monger in that it can override the functioning of other Gossip Mongers. Or, when multiple classes of nodes are supported, the existing AXIS handlers may be adapted to recognizing identifiers of the classes, and determining which operations can be accessed by the corresponding nodes. For example, while "class 0" nodes (i.e. the default peer nodes) may make queries and assert their reputations, traversal paths, and so forth, nodes of another "class N" (such as the system nodes described herein) may be permitted to read and write linkbases and repositories, effectively managing the network views maintained by nodes. (Refer to FIGS. 17A–17C and FIG. 18, below, for more information about implementing system management capabilities using an additional AXIS handler.)

Returning now to the discussion of the content paths stored in linkbases, a linkbase according to preferred embodiments of the present invention is comprised of a volatile component and a persistent component. The volatile component is referred to herein as a "resource set", and the persistent component is the collection of traversal path definitions. The resource set is illustrated by XML document 600 of FIG. 6. The resource set is defined as a collection of XLink locator links. One group of these links is used to define the mapping between dynamically-assigned network addresses and persisted LBuuid values for every node that the current node is aware of. These links are specified as <node> elements. Another group is used to define links that map descriptions of downloaded content to locations where that content currently resides in a local content repository. These links are specified as <content> elements.

The linkbase resource set is preferably stored as an in-memory table to enable fast look-ups of the mappings. Thus, if a node wants to interact with a peer node, it can consult this table to find the node's current address. The root element of the document storing the resource set is <ResourceSet>, which is defined as an extended XLink (see the "type" attribute at 605).

As shown in FIG. 6, the first three elements 610, 630, 645 are <node> elements which define mappings between newly resolved network endpoints (i.e. URLs) and persistent linkbase IDs. The "href" attributes of the <node> elements identify the new endpoints, and the "role" attributes identify the persisted LBuuids. The fourth element 660 is a <content> element which specifies a content resource, and identifies local content which has been downloaded from the peer network. The "href" attributes of the <content> elements identify the current storage location of the content, and the "role" attributes identify the persisted storage location identifiers.

Each <node> element is a locator XLink (see, for example, the "type" attribute at 615) with an "href" attribute indicating the network endpoint of the node which is maintaining the linkbase with ID equal to the value of the "role" attribute. For example, "href" attribute 620 has the value "http://9.56.34.12/soap/rpcrouter". According to the mapping in element 610, this URL represents the node which is managing the linkbase having the persistent LBuuid "9.37.43.2-05/04/01-12:02:05:37-NetZero.net". The first <node> element 610 pertains to the local node (having a "local" attribute whose value is set to "true"), whereas the other <node> elements 630, 645 pertain to remote nodes (having a "local" attribute whose value is set to "false").

The <content> element 660 is also a locator XLink. The "href" attribute 665 of this mapping indicates that the storage location "file://usr/awesley/etc/downloads/purchase_order 123-4567-890.xml" is currently used for storing the local content identified as "purchase_order 123-4567-890.xml" (see "role" attribute 670).

The persistent component of the linkbase (i.e. the traversal path definitions) is represented within the resource set by the collection of arcs which denote the traversal path of a specific content resource from one node to another, where nodes are identified by their respective linkbase ID (i.e. LBuuid) values.

Referring now to FIG. 7, a sample traversal path definition 700 is provided. This example illustrates how a directed graph is used for tracking the path taken by a content resource since it entered the P2P network. The traversal path is specified using a <traversalPath> element 705. One or more <arc> elements, represented in the example by elements 710 and 735, are XLink elements which have a "type" attribute of "arc". (See, for example, reference numeral 715.) These <arc> attribute values specify movement of the content from one node to another. Arc XLink elements leverage the roles of resource and locator nodes. The locator nodes are defined in the resource set, as illustrated by FIG. 6, and the resource nodes are identified using the "resource" attribute of the <arc> nodes in FIG. 7. This will now be described with reference to the path beginning at <arc> link 710, which specifies that the content identified at 730 as "purchase_order 123-4567-890.xml" (which, according to element 660 of FIG. 6, is currently stored at location "file://usr/awesley/etc/downloads/purchase_order 123-4567-890.xml", and which represents a purchase order for customer 123-4567-890) was generated by (or at least entered the network at) the node managing the "12.37.43.5-03/03/01-08:35:13:04-MindSpring.com" linkbase (see the value of "from" attribute 720). The value of the "to" attribute 725 indicates that this content was then downloaded by the node managing the "12.37.43.5-03/02/01-03:45:23:02-MindSpring.com" linkbase.

Continuing with the <arc> node 735, the value of "resource" attribute 750 is identical to the value of "resource" attribute 730, and the "from" attribute 740 has the same value as the "to" attribute 725 of the previous <arc> element 710, indicating that this is a further traversal for the same content. Thus, the final "to" attribute 745 indicates that the content was downloaded by the current node. If an application reading the linkbase identified at 705 wishes to access the content specified at 750, it may do so by leveraging the <content> XLink defined in the resource set. See reference numeral 660, where the corresponding <content> element is defined. By matching the value of the "resource" attribute 750 to the value of "role" attribute 670, this <content> element 660 is selected from the resource set, and the actual location of the content is then found using the value of its "href" attribute 665. Thus, in the general case, the persisted arcs represented by <arc> elements in a traversal path definition connect linkbases through their "resource" attribute value and the "role" attribute value of a <content> element in the resource set, where that <content> element provides the location of a persisted content resource.

Preferred embodiments of the present invention use a bootstrap flow, described herein as having seven stages, to initialize all nodes on the network at load time (including system nodes, when implemented). This flow will now be described with reference to FIG. 8. In the first stage (Block 800), the node in question resolves its own IP address. Assuming the node does not have a static IP address, a dynamic address assignment technique of the prior art (such as the Dynamic Host Configuration Protocol, or "DHCP", or the Auto IP protocol, etc.) is preferably used for this purpose. (If a node has a static IP address, then it may skip this stage.)

As a precursor to the second stage, a test is made (Block 810) to see if the node already has an LBuuid of the form disclosed herein. If the result of this test is negative, then in stage two, an LBuuid for the node's linkbase is generated (Block 820). This negative result occurs on the first invocation of the peer node, when the linkbase must also be initialized. The LBuuid generated in this stage serves as the UUID for the node's linkbase, where the LBuuid is of the form:

$$LBuuid = f(current\_IP\_Address, current\_Date, current\_Time, a)$$

Preferably, the "a" parameter serves as an indicator of the provider of the IP address (e.g. its domain name), as described earlier. Alternatively, "a" may be a parameter as used in prior art UUIDs, which use a random number. Any UUID generation algorithm may be used, however to allow for accountability and tracking as has been described above, it is preferred that the generated value be in a form that provides the ability to trace a linkbase to its owner and thereby track a content resource to its origin (and the peer nodes which downloaded it).

When initializing the linkbase, a set of arcs is created to represent how the node's local content has traversed the network. (Refer to FIG. 7, where examples are discussed.)

Once an LBuuid is available for the node's linkbase, stage three commences to broadcast an "alive" message from the node (Block 830). The alive message advertises the node's presence on the network. In preferred embodiments of the present invention, the alive message leverages SOAP over HTTMU. HTTMU is a UDP multicast-based version of HTTP, and allows the alive message to be sent to all nodes on the subnet. A sample alive message is illustrated in FIG. 9, where a <notification> element 905 has a "type" attribute 910 set to "alive". According to preferred embodiments, the alive message also specifies the LBuuid value for the node's linkbase (see the <linkBaseID> element at 925) and a reference to the node's version of its own reputation (see the <reputationRef> element at 930). The reputation information is shown in FIG. 9 as being provided by a simple link to a document identified through an "href" attribute 935. The value of this attribute provides a URL where the node's reputation information is persisted. Thus, the alive message informs peer nodes of how to find the sending node's persisted identifier and the location of its reputation. The alive message also preferably includes call back information which indicates a callback address for the response message (see the "callback" attribute 920), where the node's current IP address is provided, and another attribute 915 specifying one of the following:

1) An inquiry Uniform Resource Indicator ("URI") which points to a UDDI registry, along with a binding key for a file-sharing service available from this node. Thus, when using the web services model with a UDDI registry, the alive message in this option identifies not only the registry that holds the publish and inquiry Application Programming Interface ("API") for this service, but also the binding key for this file-sharing service.

2) Some non-UDDI way to discover a node's file-sharing service, such as a Web Services Inspection Language ("WSIL") reference. WSIL is a notation designed for assisting in the inspection of a site for available services and for specifying a set of rules indicating how inspection-related information should be made available for consumption. WSWL is defined by IBM and Microsoft, and consolidates concepts found in earlier endeavors referred to as "ADS" from IBM and "DISCO" from Microsoft. (Refer to "Web Services Inspection Language (WS-Inspection) 1.0", Keith Ballinger et al. (November 2001), published by IBM on the Internet at http://www-106.ibm.com/developerworks/library/ws-wsilspec.html, for more information on WSIL.)

In the example in FIG. 9, the second option has been selected, and thus attribute 915 is a "wsil" attribute which specifies a URL at which WSIL information is stored.

Continuing on to stage four (represented by Block 840), the node listens for a SOAP over HTTP response to be sent by peers who receive the alive message sent at Block 830. According to preferred embodiments, the response message from each of these remote nodes is also an alive message, and specifies the LBuuid for the remote peer, along with a URL identifying where to find the remote node's self-managed reputation information. As described earlier, a node's reputation includes a stature value representing how successful that node is at handling queries. (As discussed with reference to FIGS. 4A and 4B, the stature value may represent all of the node's queries, or query-specific values may be provided.)

If the local (receiving) node has its own version of the remote node's reputation, then the two reputations are preferably merged for storing in a local repository (such as an in-memory table) which the local node creates to represent the remote nodes it knows about (i.e. the remote nodes in its resource set). According to preferred embodiments, when the local node's view of the remote node diverges from the remote node's view of its reputation, the merge operation comprises copying the remote node's input over the local node's information. (This may be appropriate when the local node has been absent for the network for some period, during which time the remote node's reputation was revised; or, the local node might have missed some propagation of the remote node's activities for other reasons, causing it to fall behind in what it knows about that remote node.) However, if the local node has identified the remote node as malicious, then (in the general case) the local node preferably ignores the remote node's incoming view of its reputation. Other techniques for deriving a local reputation value for a remote node may be used without deviating from the scope of the present invention, such as averaging the local view with the remote node's view, or extrapolation (e.g. to incorporate what the local node knows, and what it does not know, about another node's interactions).

When a system-level Gossip Monger is defined, and has permission to inject reputation information into repositories maintained by peer nodes, then the local Gossip Monger may have its view of a remote node's reputation overridden by this system-level Gossip Monger.

In stage five (represented by Block 850), the local node issues what is referred to herein as a "spy" message. Preferably, this spy message is sent directly to all peers who have responded (at Block 840) to the local node's initial "alive" request, and essentially requests that each peer propagate the alive request to each node on the network of which that peer is aware. Multi-homed peers (i.e. those which support more than one network connection) may then forward the alive request to peers beyond the current subnet. These peer nodes will then respond with alive response messages of their own, enabling the local node to dynamically learn the P2P network topology. The information gathered from the returned alive messages is used to build the LBuuid to URL mappings (in the local node's resource set), thereby enabling the node to resolve the identities of its peer nodes.

Note that spy messages are considered an optional aspect of the present invention, and the depth of propagation for spy messages is preferably determined by the requesting application. The spy message may have an optional depth attribute which determines the maximum number of sequential forwards. The spy message preferably provides a UUID for the message, in order to avoid recursive processing of spy messages which trigger endless loops.

FIG. 10 shows how a sample spy message 1005 may be embodied within a SOAP message 1000. In this example, a "UUID" attribute 1010 is specified to prevent recursive forwarding. (The "[LBuuid]" syntax in the example is to be replaced with the actual LBuuid of the local node.)

Figure 8:
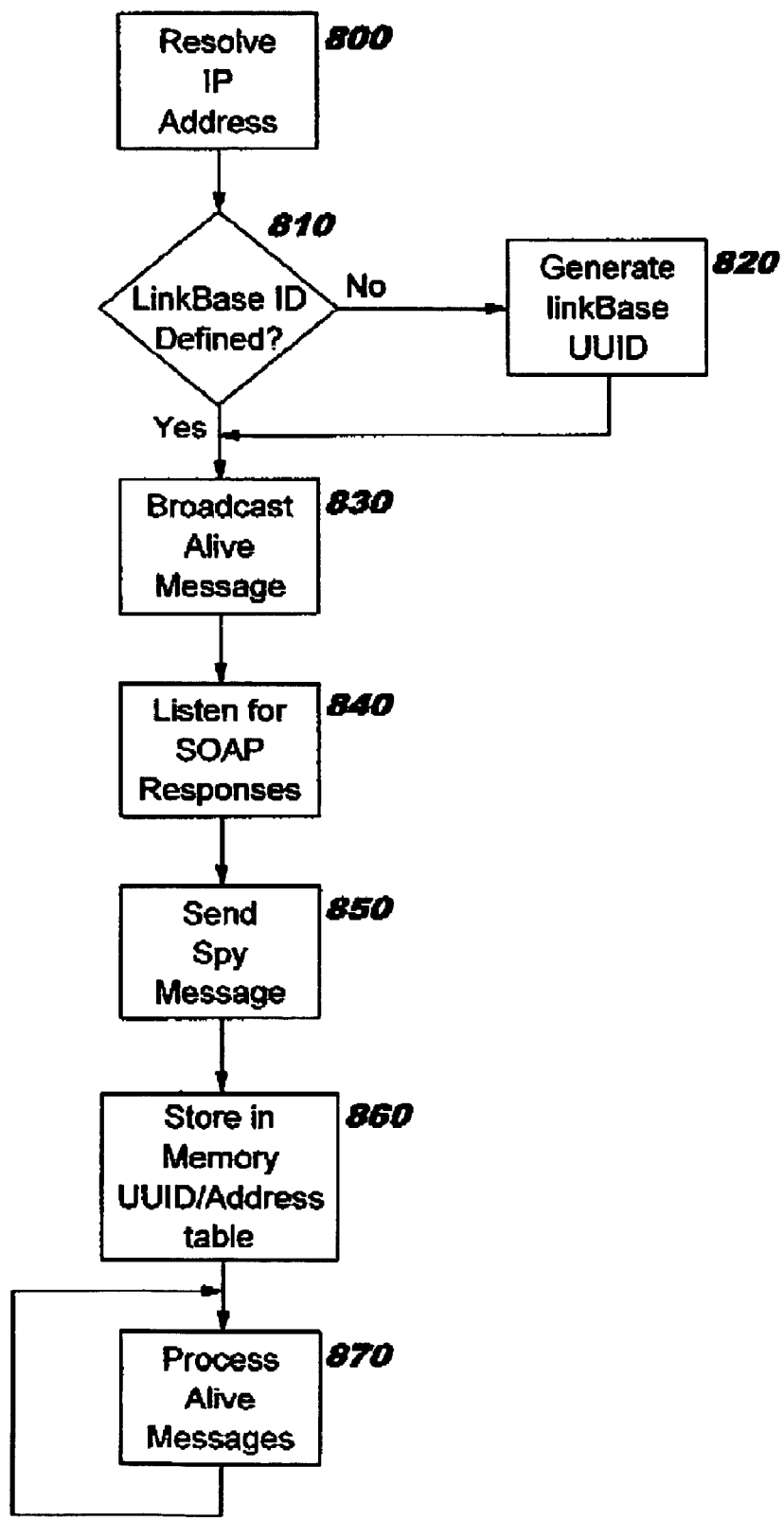
FIG. 8 illustrates a bootstrap flow executed by nodes in a P2P network upon initialization, according to preferred embodiments.

Returning to the discussion of FIG. 8, in stage six (represented by Block 860), the local node uses alive messages it receives in response to its own alive message (and in response to its spy message, when implemented) to update its in-memory table entries which map network endpoints to the linkbase IDs of remote nodes. The collection of these entries comprises the <node> elements in the local linkbase's resource set, as illustrated by the example in FIG. 6. The update process comprises updating URLs as necessary, such that the in-memory table identifies the current location of the node associated with each LBuuid. (Note that because the resource set is an XML document, which is preferably stored using a Document Object Model or "DOM" tree, adding new entries corresponds to creating new DOM tree nodes. Techniques for building DOM tree nodes from XML syntax elements are well known in the art.)

A node may also update locally stored reputation information pertaining to the remote nodes which return alive messages in response to the spy message. Refer to the discussion of Block 840, where this reputation updating is described with reference to the nodes responding to the node's own alive message.

Lastly, in stage seven (Block 870), the local node listens for alive messages from other peer nodes, preferably over a reserved HTTPMU channel, and sends an alive message in response (which is analogous to the alive response messages described with reference to Block 840). This listening process is preferably ongoing, enabling the node to maintain awareness of its peers on the P2P network and revise its resource set (which caches correlations between LBuuids and URLs) and the locally-stored peer reputation information accordingly.

Figure 11:
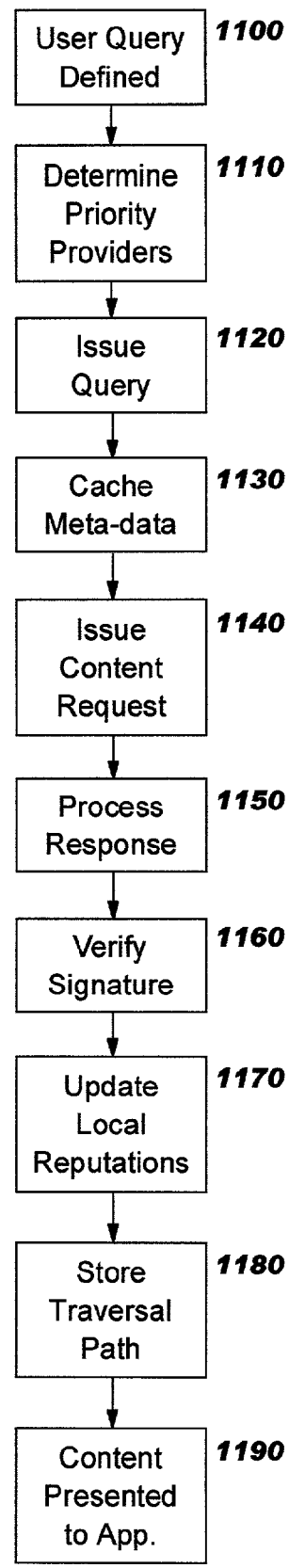
FIG. 11 illustrates a requester flow with which a node locates a content provider or service provider, requests the content/service, and receives the content/service, according to preferred embodiments.

FIG. 11 provides a flowchart showing a flow that may be used by a node as it requests content from its peers. This process begins at Block 1100, where a user defines the query of interest. The query is preferably expressed as a query string, which may be entered by the user, selected by the user from a menu, read from a file identified by the user, etc. Typically, the user is a human user, although a programmatic process may alternatively determine the query and supply the query string. For example, to request a purchase order for customer number 123-4567-890, as shown in the preceding examples, the query string would be formatted as "purchase_ order 123-4567-890".

In Block 1110, an optimization process is preferably performed, whereby the node evaluates the reputations of its peer nodes to resolve what are referred to herein as "broadcast tiers". These broadcast tiers specify a hierarchical approach to query resolution, and the peer nodes in each tier are selected based on their perceived ability to satisfy the query. This hierarchical approach attempts to reduce the number of query request messages and response messages which traverse the network. Preferably, a pattern matching approach is used to determine which nodes can answer a particular query, using the <QuerySet> in each node's reputation. Refer to FIGS. 4A and 4B. For example, if a particular node cannot answer the "purchase_order 999-9999-999" query pattern represented using the syntax at 420, then it is inefficient to send a query of that form to this particular node. Instead, the nodes whose reputations indicate that they support this query, and which have relatively higher stature values, would be selected as a first broadcast tier.

As an optional enhancement of this pattern matching operation, a site summary may be leveraged. "Site summary" refers to a content syndication technique provided using RDF and known in the art as "RSS". A site summary may comprise a set of content descriptions, describing the content/services available from a particular site (i.e. the node's query set). When the set of descriptions is changed, for example to add new content for a site, the description can be proactively pushed to syndicators of the content using RSS. Nodes initially learn of one another's reputations via the alive messages, as discussed above. As the nodes participate in interactions with other nodes, their reputations (including their stature, and possibility their query set) typically change. It may happen that some nodes do not interact with other nodes frequently, causing those nodes' view of each other's reputation to become outdated. Site summaries may therefore be used advantageously to periodically propagate reputation information among the nodes in the network.

The request is sent to the identified "priority providers" in Block 1120. Preferably, the queries are sent using a directed "broadcast" approach (over HTTP), where the resource set is used to determine the current IP address of each of the target nodes. (If broadcast tiers are not used, then the targets of the query message may be determined in another manner, including sending the message to all peers represented in the resource set.) A sample query embodied in a SOAP message 1200 is illustrated in FIG. 12. As shown in this example, the <query> tag 1205 has as its value 1210 the text string representation of the query, where the account number of interest ("123-4567-890") has been provided as an input parameter value. (Note that this query will be interpreted by the receiving peers as a type of probe, whereby they are being queried to determine whether they do in fact support this query, and what they assert as being their current stature for answering the query. The message sent at 1120 is not an actual content request.)

If no satisfactory response is received from any nodes in the first tier (i.e. none of the queried peers is able to respond to the query with an acceptable stature), then control returns to Block 1110 where a second tier comprised of the next best set of peers is identified. (Preferably, a time interval, which may be configurable, is used to limit the time spent waiting for the queried peers to respond.) This second tier preferably comprises those peers which also support this query but have lower stature values than the first tier. The requests are then sent again by Block 1120.

This process of sending query requests to peers in various tiers will continue until all non-malicious peer nodes have been queried, or a satisfactory response to the query request has been received. Control then reaches Block 1130.

Note that in some cases, it may be productive to eventually send the query request to nodes which do not indicate support for the query: because of the ad hoc nature of the network, the local node will typically not know the most current information about the reputations of all of its peers (including their query sets) all of the time. Thus, a peer node which can do a good job of responding to the requested query may be found, even though the local node's information does not show that peer as being a good candidate.

Returning again to FIG. 11, assuming that one or more of the queried peers responds that they do in fact support this query, in Block 1130 the local Gossip Monger handler processes the meta-data from the responding nodes. That is, the response message from the remote peers will contain meta-data describing the content which best satisfies the request within the remote node's content repository, and information from this response message is preferably cached locally for processing by Block 1140. See the sample SOAP response message 1300 in FIG. 13, where a <content-meta-data> tag 1305 in the SOAP header provides a simple XLink element that points to the location of the content meta-data. In the example, the value of "href" attribute 1310 indicates that information identified as "purchase_order_123-4567-890.rdf" is embedded herein as the first child of the <queryResponse> element (see the xpointer syntax at 1315). The <queryResponse> element is shown at 1320, and contains an RDF specification of the content meta-data (see 1325) from the responding node. As shown in this example, the responder indicates the name of the document it would return (see the "about" attribute value at 1330); content creator information including the date and time of creation, as well as the name of the creator (see the <Creator> element 1335); and a synopsis pertaining to the named document (see the <synopsis> element 1340).

The content meta-data from the collection of responding nodes is then evaluated by the user. As stated earlier, this user evaluation may be performed by a human, or by a programmatic process. When the user is a human, the value of the <synopsis> element 1340 is preferably displayed on a graphical user interface panel, and other values from the <Description> element 1325 may also be displayed if desired. After analyzing the content meta-data, the user identifies his/her/its preference for which peer or peers best satisfies the query, and a request for the content is then issued as a SOAP POST request (Block 1140).

FIG. 14 provides a sample SOAP POST request 1400 with which a content request is transmitted according to preferred embodiments. In this example, the SOAP envelope embodies a <getContent> element 1405, which has as the value of its "ID" attribute 1410 the text of the user's content request (which was sent in the query request message of FIG. 12). Alternatively, the value received in the "about" attribute 1330 of the response message may be used as the value of "ID" attribute 1410.

The peer node preferably returns the requested content encoded as a SOAP response message with a multipart Multi-purpose Internet Mail Extensions ("MIME") structure. Upon receiving the requested content, the receiving node processes that content (Block 1150). A specification being promulgated by W3C which is titled "SOAP Messages with Attachments, W3C Note 11 Dec. 2000" (see http://www.w3.org/TR/2000/NOTE-SOAP-attachments-20001211) describes a standard way to associate a SOAP message with one or more attachments in their native format using a multipart MIME structure for transporting the attachments. An example of the SOAP response message is shown at 1500 of FIG. 15, wherein the response to the content request is specified in a MIME attachment as represented by reference numeral 1520. According to preferred embodiments, the SOAP response also has headers indicating the traversal path of this content since entering the peer network (see 1505), and the remote peer satisfying the request preferably also provides a URL identifying its own representation of its reputation (see 1510).

The processing performed at Block 1150 comprises extracting the traversal path and remote reputation information (after first decrypting the message, if required, using a decryption handler).

The digital signature handler then verifies all digital signatures on this message (Block 1160). If authentication of the sender fails, or message integrity checks fail, then this will adversely impact the reputation of the peer, and the reputation asserted by that peer node will preferably be ignored. (Alternatively, it might be desirable in a particular implementation to decrement the local version of this peer node's reputation under such circumstances.)

The locally-maintained reputations of all peer nodes who were issued the content request 1400 are updated (Block 1170) to reflect their success rate at satisfying queries. Preferably, this comprises incrementing the value of a "totalQueries" attribute, and incrementing or not incrementing a success count, as appropriate for this particular responder, followed by recomputing the stature. In preferred embodiments, the stature is computed by dividing the success count by the totalQueries value. These updated values are then locally stored. In alternative embodiments, the stature may be computed in other ways.

In Block 1180, assuming the peer has been successfully authenticated, the traversal path information obtained from that peer's response message (see reference numeral 1505 of document 1500 in FIG. 15) will be stored locally and associated with the newly-received content. (See <content> element 660 in resource set 600 of FIG. 6 for an example.) In addition, the traversal path will be extended to include the current node as the latest target node in the directed graph (that is, by creating a new <arc> element of the form shown at 735 in FIG. 7).

Finally, the received content is presented to the application (Block 1190), which then processes that content in an application-specific manner. The requester flow of FIG. 11 then ends for this content request.

Note that as an optional extension of the processing shown in FIG. 11, the user may provide feedback on whether the content ultimately satisfied his/her/its request, which may impact the stature of the provider node.

Figure 16:
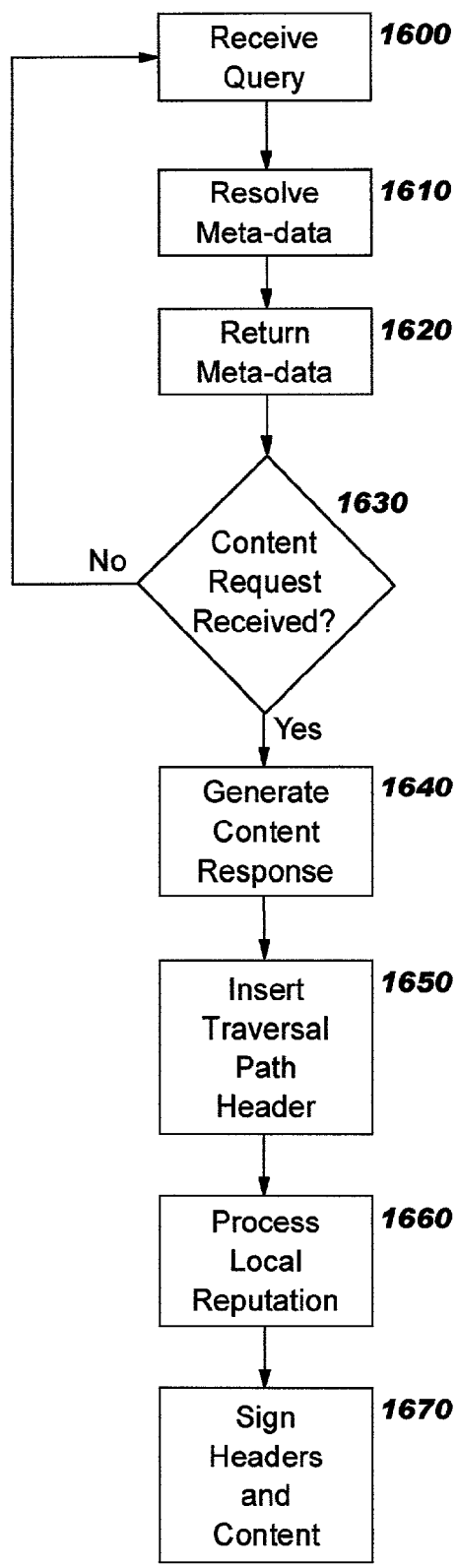
FIG. 16 illustrates a provider flow with which a node responds to a query from a requester, and if selected by that requester, responds with the requested content or a result of the requested service, according to preferred embodiments.

Turning now to FIG. 16, a preferred embodiment of the provider flow with which a (remote) peer node evaluates and responds to content requests will be described. This process begins at Block 1600, where the peer node receives a query and extracts the query string from the received query.

In Block 1610, the peer node performs a pattern matching operation to match the extracted query string against its own content meta-data to determine whether it can answer this query. (Refer to FIGS. 4A and 4B, where a sample <QuerySet> element identifies the queries a particular node can support.) Note that a particular implementation of the present invention may leverage a site summary to expedite this pattern matching process, as described earlier with reference to identifying target nodes for query messages.

If this peer node can perform the requested query, it creates a SOAP response message of the form described above with reference to Block 1130 (which discussed the requesting node receiving the responses from potential content providers) and returns that message to the requester (Block 1620). As discussed above, this response message contains a SOAP envelope which encompasses an RDF message having meta-data that describes the content offered by this peer node for satisfying the query request.

Note also that in some cases, the response message sent by Block 1620 may contain multiple RDF messages. This may happen when a particular node is able to support a query in more than one way. Furthermore, it may happen that the query request specified using SOAP header 1200 (sent as described with reference to Block 1120) contains more than one query pattern (e.g. formatted as more than one <query> tag 1205). The response may contain a plurality of RDF messages in this case as well.

After issuing a response message, the provider node listens for incoming content requests from the requester node (Block 1630). Rather than the "can you support this query" message received in Block 1610, this awaited content request is a "please perform this query" request. According to preferred embodiments, the node will listen for the incoming content request for a configured time interval. If the time interval elapses without receiving the awaited request, then processing of this content request is considered to be complete, and control is therefore shown as returning to Block 1600 to await the next "can you support this query" request message. (As will be obvious, a separate thread is preferably used, such that the node watches for incoming requests on an on-going basis.) Otherwise, if the awaited "please perform this query" request message is received, then processing transfers from Block 1630 to Block 1640.

Block 1640 invokes processing of the requested query, and formats the result as a SOAP response message using multipart MIME attachments (as described above with reference to FIG. 15).

In Block 1650, the Path Intimater of the provider node prepends a reference to the content's traversal path as a SOAP header for the outbound message. Refer to FIG. 15, where SOAP header 1505 provides the traversal path definition information, as illustrated by FIG. 3A. (As described earlier, the <traversalPathRef> tag 305 in header document 300 provides a reference 310 to a linkset which stores the traversal path of the specified content within the peer network.) The present invention also updates the locally-stored content traversal path definition (e.g. as being generated by this node with particular date and time values, or forwarded by this node with particular date and time values, as appropriate).

The provider node's Gossip Monger then updates the node's local reputation (Block 1660), stores the updated information, and includes the reputation information in a SOAP header of the outbound message. (Refer again to FIG. 15, where SOAP header 1510 encompasses the responding node's version of its reputation, as illustrated by FIG. 3B.) When updating its reputation, the provider node preferably counts the interaction as a failure to satisfy the content request if the time interval expires without receiving a "please perform this query" request. Otherwise, the provider node preferably counts this interaction as a success. Taking the success or failure outcome into account, the "stature" attribute is recomputed, as discussed above with reference to Block 1170 of FIG. 11. (Note that the failure processing would be performed as a result of a negative result at Block 1630.)

The generated response message is then digitally signed (including the SOAP headers and attachments) by the Digital Signature handler (Block 1670), and the response message is then returned to the requester.

FIGS. 17A–17C illustrate sample headers that may be used with an optional system management capability which has been described herein. Preferably, an additional AXIS handler is provided in the nodes to be managed, and one or more nodes having management "authority" communicate management information that is processed by that AXIS handler in receiving nodes. The additional AXIS handler which provides system management capability is referred to herein as the "Management handler". Because there is no centralized management node in preferred embodiments of the present invention, the nodes which may function as management nodes (e.g. directing other peer nodes in some way) are preferably those nodes having a reputation with a relatively high stature level.

Due to the evolutionary trust model disclosed herein, any node may potentially achieve management stature and thereby operate as a system node. Thus, the system management functionality may be deployed in all nodes on the network if desired, or in a plurality of nodes. The management code in a system node is preferably certified by a certificate authority, enabling other nodes to trust messages issued by that code: digital signatures on these messages allow the Management handler in receiving nodes to verify the source of the messages.

In preferred embodiments, the Management handler supports two new header types, which are referred to herein as "peek" and "access". The peek header may be used to inform a node that its traffic is to be monitored by the system node. The access header may be used to read from, or write to, a node's linkbase, reputation repository, or content repository.

FIG. 17A provides an example of the peek header. The peek message is sent by the system node to notify the receiving node's Management handler to replicate SOAP messages with the specified system node. Thus, the header shown as element 1700 is a simple XLink specifying an address 1710 that identifies the sender of the message (i.e. the system node). The receiving node then uses this address for the replication of its SOAP traffic. Optionally, attributes may be specified on the <peek> element to notify the receiver of categories of SOAP messages which are to be replicated. By default, all SOAP messages are preferably replicated.

FIGS. 17B and 17C illustrate the access command. The access command may be used to access the receiving node's system resources, as stated above. The command format may be specified as either a write operation or a read operation, through a corresponding value on the "command" attribute. In the example <access> header 1730 in FIG. 17B, which illustrates a write operation, the system node is instructing the Management handler at the receiving node that new reputation information is being provided in the encapsulated reputation reference 1750. The Management handler may then forward this information to the co-located Gossip Monger handler. In the example, the reputation reference 1750 identifies the location of a reputation repository where the asserted reputation information can be found. The receiving node may choose to retrieve a copy of the reputation for storing locally; or, the receiving node may choose to store the link, and access the reputation from the repository when information is needed. Alternatively, a syntax form (not shown) may be used whereby the reputation itself is encapsulated within the header (with attributes for identifying the LBuuid of a peer node, its asserted stature, and optionally its query set). The "href" attribute 1740 provides an address of the system node, enabling the receiving node to identify the sender of the header.

In the example <access> header 1760 in FIG. 17C, which illustrates a read operation, the command provides a "link-BaseURI" attribute 1780 to identify a linkbase to which the system node seeks access. In the example, the value of this attribute uses xpointer notation to signify that the <content> element is to be located within the <ResourceSet> document, where the example document is stored at "http://9.56.34.12/linkbase/lb.xml". Attributes may alternatively be provided on the access command for accessing the reputation repository or content repository. The "href" attribute 1770 provides an address of the system node, enabling the receiving node to identify the sender of the header and, for the read command, to return the requested information.

Preferably, a receiving node ascertains the system node's stature in the process of verifying the sender, to determine whether the sending system node has earned sufficient trust to be performing management functions. The digital signatures added by the Management handler are also preferably verified to ensure that the header messages originated from the corresponding system node. Optionally, the receiving node may issue a challenge to the sender in order to verify the sender's identity; this is facilitated through use of "href" attributes that identify the sending system node, as indicated in the examples in FIGS. 17A–17C.

Figure 18:
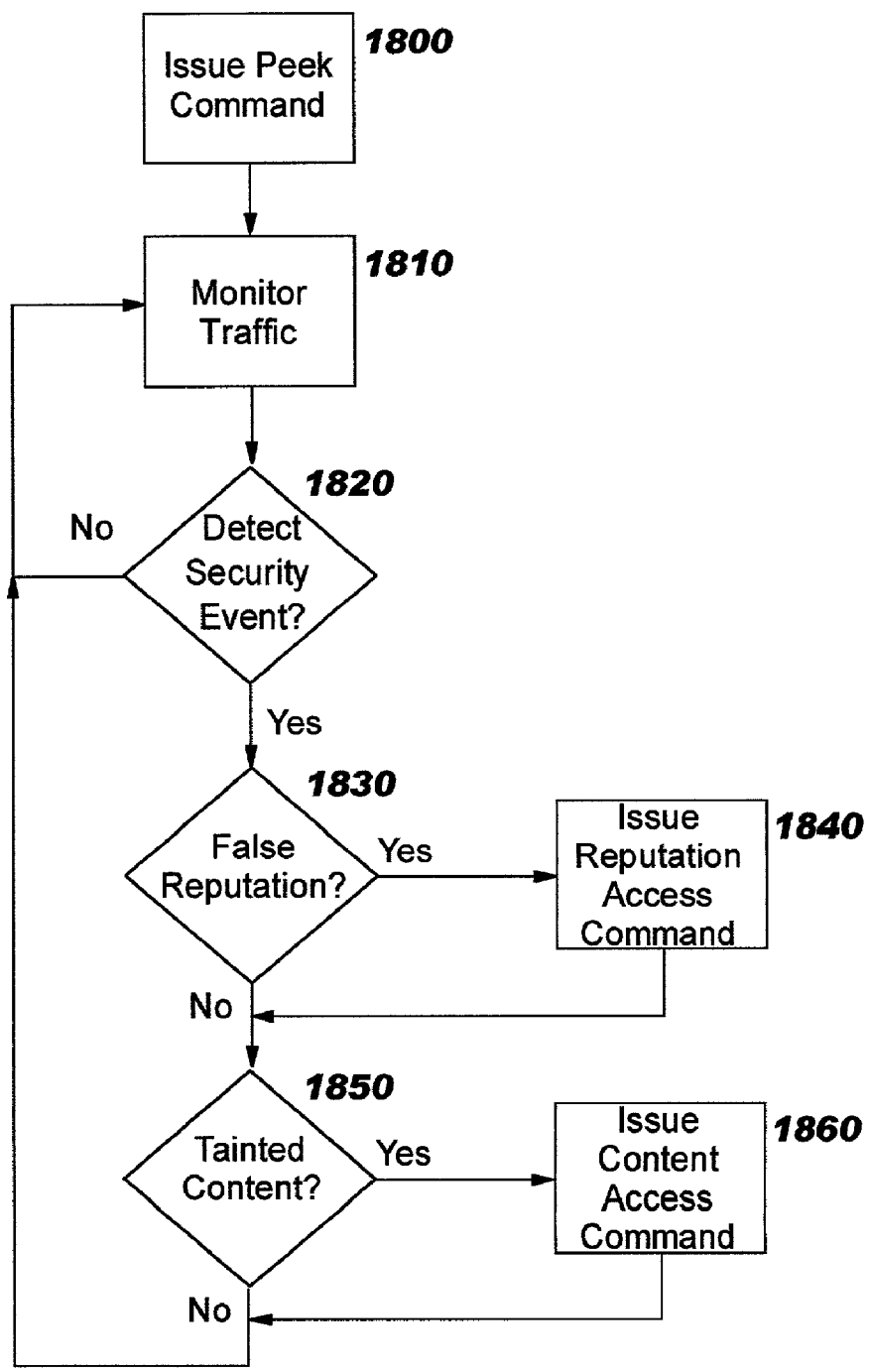
FIG. 18 illustrates a management flow that may be implemented by system nodes providing the optional system management capability.

Referring now to FIG. 18, a management flow is shown that may be implemented by system nodes for carrying out system management capabilities (e.g. to monitor and manage the peer community). In Block 1800, the system node invokes the peek operation; preferably, the peek header is sent to nodes as they join the network (which may be detected by their issuance of "alive" messages, as described above with reference to FIG. 8).

Once the peer nodes begin replicating their SOAP traffic to the system node, the system node monitors that traffic (Block 1810). In particular, the system node preferably monitors all transmissions of reputations and content. The system node can therefore observe what the various peer nodes are asserting their reputations to be, including references to their reputation repositories, and can also observe whether content from particular nodes is being accepted as constituting a successful interaction.

In Block 1820, the system node is shown as evaluating the monitored traffic to detect security events. Preferably, the system node triggers a security event when false reputation information is asserted and also when tainted content is being propagated. For example, if a node asserts that it has a high positive stature value, but the system node has observed many peers rejecting content from this node, then the system node may conclude that the asserting node is a malicious node. Similarly, the system node may detect peer nodes rejecting particular content, and may conclude that the content is tainted; a security event is preferably triggered in this situation as well.

When a detected security event involves a false reputation (see Block 1830), the management flow at the system node transfers to Block 1840, where the system node issues an access command to access that node's reputation (preferably using a write operation to impose the system node's view of the reputation on receiving nodes). Note that the system node may inform a node of it's own reputation, or of the reputation of another peer node. A reserved area may be provided within the reputation repository (where this reserved area cannot be overwritten by a malicious node), and the write operation may then cause information to be written into this reserved area. Malicious nodes can be prevented from writing into this area of the repository to falsely establish high stature values. When a node subsequently accesses the reputation repository, it preferably interprets information stored in the reserved area as taking preference over other data pertaining to the same reputation. Alternatively, if a reserved area is not used, then the information sent by the system node on the access header may be written into non-reserved storage. (Note that peer nodes may also send reputation information to one another, as has been described, either in the form of a reputation reference or a message containing reputation information.)

The test in Block 1850 determines whether the security event was related to tainted content. If so, then processing reaches Block 1860, where the system node issues an access command to assert that content stored by a peer is tainted (e.g. to access and overwrite linkbase data in order to modify traversal paths). The linkbase may also use a reserved area, into which the system node can write content path traversal information.

The system node may also be allowed to issue commands to overwrite the node's locally-stored content, if desired in a particular implementation, as discussed earlier with reference to use of other attributes on the access header. Processing of access commands that affect the content repository may be performed in an analogous manner to that which has been described for commands affecting the reputation and content traversal paths.

Once the security event processing is complete, control returns to Block 1810 to continue monitoring traffic of the peer nodes. (As will be obvious, the security processing is preferably performed by a separate thread, such that the monitoring is not interrupted.)

While the monitoring function has been described with reference to security, implementations of the present invention may use information gathered from monitoring peer node traffic for other purposes. Examples of other uses include failover and high availability scenarios. In a failover scenario, for example, the access command can be used to replace references to a failing node with references to a backup node, or perhaps to delete references to a node which has failed. These changes may be made by identifying the failed node in the resource set, and replacing or deleting the entries referring to the node's LBuuid. In a high availability scenario, when the system node detects that a particular peer node is overloaded, or perhaps that resources of other nodes are under utilized, the access command can be used to modify linkbase references to content (or to a service) such that traffic is re-directed to a different node where the content (or the service) may alternatively be obtained.

As has been demonstrated, the techniques disclosed herein provide a framework for a managed peer-to-peer network, and enable maintaining peer relationships across invocations and reusing those relationships and identities as ad hoc communities are formed. As discussed above, peer nodes may enter and leave the network at will, and the techniques disclosed herein enable providing security, management, and other system-level functions in the presence of these transient communities. The disclosed techniques enable transient communities in P2P networks to be managed, and allow for exchange of secure transactions where message integrity can be ensured in transient communities.

The Hailstorm project (also referred to as ".Net My Services") from Microsoft Corporation has been characterized as a P2P technology. However, the P2P support therein appears to be limited to instant messaging. Other existing P2P networking products such as JXTA, which was discussed earlier, do not provide the features disclosed herein for use in transient communities.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects.

Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While the preferred embodiments of the present invention have been described, additional variations and modifications in those embodiments may occur to those skilled in the art once they learn of the basic inventive concepts. Note also that while preferred embodiments have been described with reference to the web services environment, the disclosed techniques may also be used in other P2P network environments. Furthermore, while preferred embodiments have been described herein with reference to SOAP messages and particular syntax for message headers, documents, etc., this is for purposes of illustration and not of limitation; alternative message formats and alternative syntax may be used without deviating from the scope of the present invention. Additionally, whereas reference is made herein to transient networks, it may happen that the network topology stabilizes over time, and thus the term "transient networks" may be construed as referring to networks that have an architecture which supports a transient topology. Therefore, it is intended that the appended claims shall be construed to include the preferred embodiments and all such variations and modifications as fall within the spirit and scope of the invention.

What is claimed is:

1. A computer-implemented method of classifying nodes into broadcast tiers to reduce traffic in a decentralized network, comprising steps of:

associating, using a mapping, a unique persistent node identifier for each of a plurality of nodes in the decentralized network with a current network address assigned to the node, wherein a different network address may be assigned to each node upon entering the network multiple times and wherein the mapping is revised to reflect the current network address assigned to each of the nodes upon each entry of the node into the network, and wherein the persistent node identifier for each of the nodes in the network comprises: (i) an original network address assigned to the node upon an initial entry of the node into the network; (ii) a date of the initial entry; (iii) a time of the initial entry; and (iv) an identifier of a network domain in which the initial entry occurred;

upon determining that a particular request is to be sent from a first of the nodes in the network, classifying, by the first node, others of the nodes into a plurality of tiers by consulting stored reputation information for each of the other nodes to determine the other node's reputation for responding to the particular request, wherein the persistent node identifier for each of the other nodes is usable for locating its stored reputation information and wherein the other nodes are classified into tiers based on the consulted reputation information;

using the mapping to determine the current network address for each of the one or more nodes in a highest one of the tiers;

sending the particular request from the first node to each of the one or more nodes in the highest one of the tiers, using the determined current network addresses; and subsequently using the mapping to determine the current network address assigned to each of the one or more nodes in a next-highest one of the tiers and sending the particular request from the first node to each of the one of more nodes in the next-highest one of the tiers, using the subsequently-determined current network addresses, only if a satisfactory response is not received from any of the nodes in the highest one of the tiers.

2. The method according to claim 1, wherein a time interval is used to limit a period for which the first node waits for responses to determine whether the satisfactory response was received.

3. The method according to claim 2, wherein the time interval is configurable.

4. A computer-implemented method of using broadcast tiers to reduce traffic in a decentralized network, comprising steps of:

selecting, by a first of a plurality of nodes in the decentralized network, one or more others of the nodes which are perceived to be best suited for responding to a particular request from the first node, as compared to nodes not selected, using stored reputation information for each of the other nodes that indicates requests that can be responded to by the node and the node's reputation for responding thereto;

determining, by the first node, a current network address of each of the selected nodes by consulting a mapping that associates a unique persistent node identifier for each of the nodes in the network which are known to the first node with a current network address assigned to the known node, wherein a different network address may be assigned to each of the known nodes upon entering the network multiple times and wherein the mapping is revised to reflect the current network address assigned to each of the known nodes upon each entry of the known node into the network and upon learning by the first node, of any change in the current network address assigned to any of the known nodes, and wherein the persistent node identifier for each of the nodes in the network comprises: (i) an original network address assigned to the node upon an initial entry of the node into the network; (ii) a date of the initial entry; (iii) a time of the initial entry; and (iv) an identifier of a network domain in which the initial entry occurred;

sending the request from the first node to each of the selected nodes, using the determined current network addresses; and subsequently determining, by the first node, the current network address assigned to each of one or more next-selected ones of the nodes not yet selected by consulting the mapping and sending the request from the first node to each of the next-selected ones of the nodes, using the subsequently-determined current network addresses, only if a satisfactory response is not received from any of the selected nodes within a configurable time interval.

5. A computer-implemented method of using broadcast tiers to reduce traffic in a decentralized network, comprising steps of:

using a mapping that associates, for each of a plurality of nodes in the decentralized network a unique persistent node identifier for the node with a current network address assigned to the node, wherein a different network address may be assigned to each node upon entering the network multiple times and wherein the mapping is revised to reflect the current network address assigned to each of the nodes upon each entry of the node into the network, and wherein the persistent node identifier for each of the nodes in the network comprises: (i) an original network address assigned to the node upon an initial entry of the node into the network; (ii) a date of the initial entry; (iii) a time of the initial entry; and (iv) an identifier of a network domain in which the initial entry occurred;

upon determining that a particular request is to be sent from a first of the nodes in the network, selecting, by the first node, one or more other ones of the nodes which are perceived to be best suited for responding to the particular request from the first node, as compared to nodes not selected, using stored reputation information for each of the nodes that is locatable using the persistent node identifier for the node and that indicates requests that can be responded to by the node and the node's reputation for responding thereto;

determining, by the first node, the current network address assigned to each of the selected nodes by consulting the mapping;

sending the particular request from the first node to each of the selected nodes, using the determined current network addresses; and if none of the selected nodes provides a satisfactory response, repeating the selecting, determining, and sending steps for nodes perceived to be next-best suited, among the nodes not yet selected, for responding to the particular request.

6. The method according to claim 5, wherein the repeating step is performed until either the satisfactory response is received or there are no more nodes suited for responding to the particular request.

7. The method according to claim 5, wherein a configurable time interval is used to limit how long the first node waits for the responses from the selected nodes before concluding that no satisfactory response was received.

8. The method according to claim 5, wherein the stored reputation information of the other nodes is stored by the first node and persists even if the other nodes leave the network and re-enter the network with the different network address.

9. The method according to claim 8, wherein the stored reputation information for a particular one of the other nodes indicates how well suited the particular node is for responding to this particular request.

10. The method according to claim 8, wherein the stored reputation information for a particular one of the other nodes indicates how well suited the particular node is for responding to a plurality of requests.

11. The method according to claim 5, wherein the stored reputation information is maintained, by the first node, for each of the other nodes.

12. The method according to claim 5, wherein the stored reputation information is obtained, by the first node, using capabilities advertised by the other nodes.

13. The method according to claim 12, wherein the capabilities are initially advertised upon each node's entry into the network.

14. The method according to claim 11, wherein the stored reputation information for each of the nodes further comprises a success measure indicating how successful the node has been when previously responding to the particular request.

15. The method according to claim 11, wherein the stored reputation information for each of the nodes further comprises an efficiency measure indicating how efficient the node has been when previously responding to the particular request.

16. The method according to claim 5, wherein the stored reputation information for each of the nodes further comprises a set of capabilities, and a success measure for the set, which was advertised by each of the other nodes upon its entry into the network.

17. The method according to claim 5, wherein the stored reputation information for each of the nodes further comprises a set of capabilities, and an efficiency measure for the set, which was advertised by each of the other nodes upon its entry into the network.

18. The method according to claim 5, wherein the stored reputation information for each of the nodes further comprises a set of capabilities, and a success measure for each of the capabilities in the set, which was advertised by each of the other nodes upon its entry into the network.

19. The method according to claim 5, wherein the stored reputation information for each of the nodes further comprises a set of capabilities, and an efficiency measure for each of the capabilities in the set, which was advertised by each of the other nodes upon its entry into the network.

20. The method according to claim 11, wherein the reputation information is periodically refreshed using information gathered from the other nodes and sent to the first node.

21. The method according to claim 11, further comprising the step of revising the stored reputation information, by the first node, as it interacts with selected ones of the other nodes and wherein the selecting step uses the revised information.

22. The method according to claim 5, wherein the stored reputation information for each of the other nodes further comprises a set of capabilities initially advertised by the other node upon its entry into the network, along with the first node's local view of at least one of the other nodes' success in performing its advertised capabilities.

23. The method according to claim 5, wherein the stored reputation information for each of the other nodes further comprises a set of capabilities initially advertised by the other node upon its entry into the network, along with the first node's local view of at least one of the other nodes' efficiency at performing its advertised capabilities.

24. The method according to claim 4, wherein the network is a peer-to-peer network.

25. A system for using broadcast tiers to reduce traffic in an ad hoc network, comprising:
- a stored mapping that associates, for each of a plurality of nodes in the ad hoc network, a unique persistent node identifier for the node with a current network address assigned to the node, even though a different network address may be assigned to the node upon entering the network multiple times, wherein the stored mapping is revised to reflect the current network address assigned to each node upon each entry of the node into the ad hoc network, and wherein the persistent node identifier for each of the nodes in the network comprises: (i) an original network address assigned to the node upon an initial entry of the node into the network; (ii) a date of the initial entry; (iii) a time of the initial entry; and (iv) an identifier of a network domain in which the initial entry occurred;
- means for recording reputation information, by each of the nodes in the network, the reputation information for each of the nodes comprising results of the node's behavior as it interacts with other nodes in the network, wherein the mapping allows persistently associating the behavior with the node even though the node's current network address may change;
- means for communicating, by each of the nodes, its recorded reputation information to others of the nodes when sending messages thereto;
- means for selecting, by a particular one of the nodes in the network upon determining that a particular request is to be sent by the particular node, one or more other ones of the nodes perceived by the particular node to be best suited for responding to the particular request from the particular node, as compared to nodes not selected, using the recorded reputation information that was communicated to the particular node by the other ones and that is locatable, via the mapping, using the persistent node identifier for the communicating node;
- means for determining, by the particular node, the current network address of each of the selected nodes by consulting the stored mapping;
- means for sending the particular request from the particular node to each of the selected nodes, using the determined current network addresses; and
- if none of the selected nodes provides a satisfactory response, means for repeating operation of the means for selecting, means for determining, and means for sending, thereby selecting and sending to nodes perceived to be next-best suited, among the nodes not yet selected, for responding to the particular request.

26. The system according to claim 25, wherein the recorded reputation information for each node indicates how successful the node is at responding to requests from other nodes.

27. The system according to claim 25, wherein the recorded reputation information for each node indicates the node's efficiency at responding to requests from other nodes.

28. A computer program product for using broadcast tiers to reduce traffic in an ad hoc network, where a collection of nodes making up the network may change over time, the computer program product embodied on one or more computer-readable media and comprising:
- computer-readable program code for associating, for each of the nodes in the network a unique persistent node identifier with a current network address assigned to the node, even though a different network address may be assigned to the node upon entering the network multiple times, wherein the persistent node identifier for each of the nodes in the network comprises: (i) an original network address assigned to the node upon an initial entry of the node into the network; (ii) a date of the initial entry; (iii) a time of the initial entry; and (iv) an identifier of a network domain in which the initial entry occurred;
- computer-readable program code for recording reputation information, by each of the nodes in the network, the reputation information for each of the nodes comprising results of the node's behavior as it interacts with other nodes in the network, wherein the mapping allows persistently associating the behavior with the node even though the node's current network address may change;
- computer-readable program code for communicating, by each of the nodes, its recorded reputation information to others of the nodes when sending messages thereto;
- computer-readable program code for selecting, by a particular one of the nodes in the network upon determining that a particular request is to be sent by the particular node, one or more other ones of the nodes perceived by the particular node to be best suited for responding to the request from the particular node, as compared to nodes not selected, using the recorded reputation information that was communicated to the particular node by the other ones and that is locatable, via the mapping, using the persistent node identifier for the communicating node;
- computer-readable program code for determining, by the particular node, the current network address of each of the selected nodes by consulting the stored mapping;
- computer-readable program code for sending the particular request from the particular node to each of the selected nodes, using the determined current network addresses; and
- if none of the selected nodes provides a satisfactory response, computer-readable program code for repeating operation of the computer-readable program code for selecting, the computer-readable program code for determining, and the computer-readable program code for sending, thereby selecting and sending to nodes perceived to be next-best suited, among the nodes not yet selected, for responding to the particular request.

29. The computer program product according to claim 28, wherein the recorded reputation information for each node indicates how successful the node is at responding to this particular request.

30. The computer program product according to claim 28, wherein the recorded reputation information for each node indicates the node's efficiency at responding to this particular request.

31. The method according to claim 5, wherein the stored reputation information is obtained, by the first node, from a query set advertised by each of the other nodes when sending one or more messages to the first node, wherein the query set advertised by each of the nodes indicates queries to which that node can respond.

32. The method according to claim 31, wherein the query set advertised by each of the nodes uses regular expression syntax to indicate the queries to which that node can respond.

33. The method according to claim 5, wherein the stored reputation information is obtained, by the first node, from a query set advertised by each of the other nodes when sending one or more messages to the first node, wherein the query set advertised by each of the nodes indicates queries to which that can respond and a stature indicating how successful the node is in responding to the queries in its query set.

* * * * *